US010456918B2

(12) United States Patent
Watanabe et al.

(10) Patent No.: US 10,456,918 B2
(45) Date of Patent: Oct. 29, 2019

(54) INFORMATION PROCESSING APPARATUS, INFORMATION PROCESSING METHOD, AND PROGRAM

(71) Applicant: CANON KABUSHIKI KAISHA, Tokyo (JP)

(72) Inventors: Daisuke Watanabe, Utsunomiya (JP); Hiroshi Okazaki, Utsunomiya (JP); Yutaka Niwayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 15/126,989

(22) PCT Filed: Mar. 10, 2015

(86) PCT No.: PCT/JP2015/001291
§ 371 (c)(1),
(2) Date: Sep. 16, 2016

(87) PCT Pub. No.: WO2015/141178
PCT Pub. Date: Sep. 24, 2015

(65) Prior Publication Data
US 2017/0106540 A1 Apr. 20, 2017

(30) Foreign Application Priority Data

Mar. 20, 2014 (JP) ................................ 2014-058491
Feb. 9, 2015 (JP) ................................ 2015-023714

(51) Int. Cl.
B25J 9/16 (2006.01)
G06T 19/20 (2011.01)
(Continued)

(52) U.S. Cl.
CPC ........ B25J 9/1697 (2013.01); G06K 9/00214 (2013.01); G06T 7/344 (2017.01);
(Continued)

(58) Field of Classification Search
CPC ........ B25J 9/1697; G06T 19/20; G06T 7/344; G06T 2200/24; G06T 2207/30164;
(Continued)

(56) References Cited

U.S. PATENT DOCUMENTS 7,996,114 B2 * 8/2011 Ban ........................ B25J 9/1697
382/153
8,660,697 B2 * 2/2014 Handa .................... G06K 9/626
382/153
(Continued)

FOREIGN PATENT DOCUMENTS

CN 102410832 A 4/2012
CN 102472609 A 5/2012
(Continued)

OTHER PUBLICATIONS

Ichida, et al., "3D Model Retrieval with Point-Sampled Representation Using Functional and Geometrical Aspects", The Journal of the Institute of Image Information and Television Engineers, Oct. 1, 2005, vol. 59, No. 10, pp. 1467-1474 (Partial translation).
(Continued)

Primary Examiner — Jaime Figueroa
(74) Attorney, Agent, or Firm — Canon U.S.A., Inc. IP Division

(57) ABSTRACT

A technique is provided, with which, even for an object which has a shape prone to be erroneously recognized and for which it is difficult to generate an initial value expected to produce a true value through fitting, it is possible to generate an appropriate initial value candidate through intuitive input and reduce erroneous recognition.

An information processing apparatus includes a model acquiring unit configured to acquire a three-dimensional shape model of a target object, a display control unit configured to cause a display unit to display the three-dimensional shape model, a setting unit configured to set (Continued)

first and second orientations different from each other on the basis of the three-dimensional shape model displayed in the display unit, a parameter deriving unit configured to derive a transformation parameter that transforms the first orientation into the second orientation, and a storage unit configured to store the transformation parameter.

14 Claims, 18 Drawing Sheets

(51) Int. Cl.
 *G06K 9/00* (2006.01)
 *G06T 7/33* (2017.01)
 *H04N 5/232* (2006.01)
(52) U.S. Cl.
 CPC ......... *G06T 19/20* (2013.01); *H04N 5/23293* (2013.01); *G05B 2219/40053* (2013.01); *G06T 2200/24* (2013.01); *G06T 2207/30164* (2013.01)
(58) Field of Classification Search
 CPC ........... G06K 9/00214; H04N 5/23293; G05B 2219/40053
 USPC .................................................. 700/245, 259
 See application file for complete search history.

(56) References Cited

U.S. PATENT DOCUMENTS

| | | | | |
|---|---|---|---|---|
| 9,026,234 | B2* | 5/2015 | Suzuki | B25J 9/1669 700/1 |
| 9,089,971 | B2* | 7/2015 | Aoba | B25J 9/1697 |
| 9,511,493 | B2* | 12/2016 | Nomura | B25J 9/1671 |
| 9,533,418 | B2* | 1/2017 | Wallack | B25J 9/1697 |
| 9,746,855 | B2* | 8/2017 | Kobayashi | B25J 9/1697 |
| 10,004,462 | B2* | 6/2018 | Ernst | A61B 6/5205 |
| 2001/0033685 | A1* | 10/2001 | Ishiyama | G06K 9/00221 382/154 |
| 2009/0116728 | A1* | 5/2009 | Agrawal | B22D 11/1265 382/154 |
| 2010/0004778 | A1* | 1/2010 | Arimatsu | B25J 9/1697 700/214 |
| 2010/0232683 | A1 | 9/2010 | Fujieda et al. | |
| 2011/0122228 | A1* | 5/2011 | Fujieda | G01B 11/03 348/46 |
| 2011/0122231 | A1* | 5/2011 | Fujieda | G06T 7/75 348/47 |
| 2011/0164114 | A1* | 7/2011 | Kobayashi | H04N 13/254 348/46 |
| 2011/0222995 | A1* | 9/2011 | Irie | B25J 9/1687 414/225.01 |
| 2012/0128204 | A1 | 5/2012 | Aoba | |
| 2012/0155751 | A1 | 6/2012 | Aoba | |
| 2013/0151007 | A1* | 6/2013 | Valpola | B25J 9/1694 700/245 |
| 2013/0158947 | A1* | 6/2013 | Suzuki | G01B 11/00 702/155 |
| 2013/0271577 | A1* | 10/2013 | Watanabe | H04N 13/275 348/46 |
| 2015/0273688 | A1* | 10/2015 | Harada | B25J 9/1612 700/259 |
| 2015/0321354 | A1* | 11/2015 | Nishihara | B25J 9/1697 700/259 |

FOREIGN PATENT DOCUMENTS

| | | |
|---|---|---|
| CN | 102914293 A | 2/2013 |
| CN | 103302666 A | 9/2013 |
| CN | 103649674 A | 3/2014 |
| EP | 2543482 A1 | 1/2013 |
| JP | H01-283677 A | 11/1989 |
| JP | 2002-63567 A | 2/2002 |
| JP | 2012-150796 A | 8/2012 |
| JP | 2012-163450 A | 8/2012 |
| JP | 2012163451 A | 8/2012 |
| WO | 2012/091144 A2 | 7/2012 |

OTHER PUBLICATIONS

Costa, et al., "3D Object Recognition and Pose with Relational Indexing", Computer Vision and Image Understanding, Jun. 1, 2000, vol. 79, Issue 3, pp. 364-407.

Gu, et al., "Car model recognition by utilizing symmetric property to overcome severe pose variation", Machine Vision and Applications, Feb. 2013, vol. 24, Issue 2, pp. 255-274.

* cited by examiner

[Fig. 1]
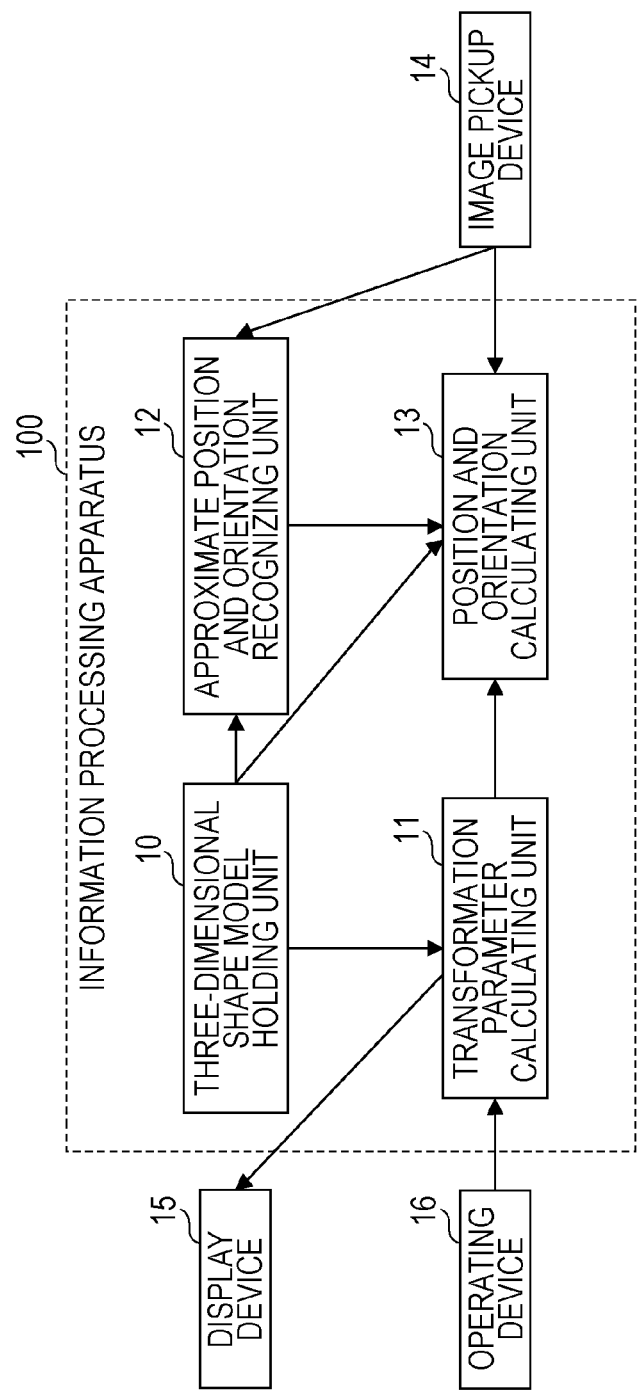

[Fig. 2]
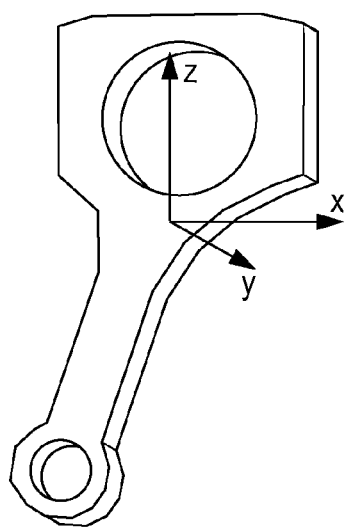

[Fig. 3]
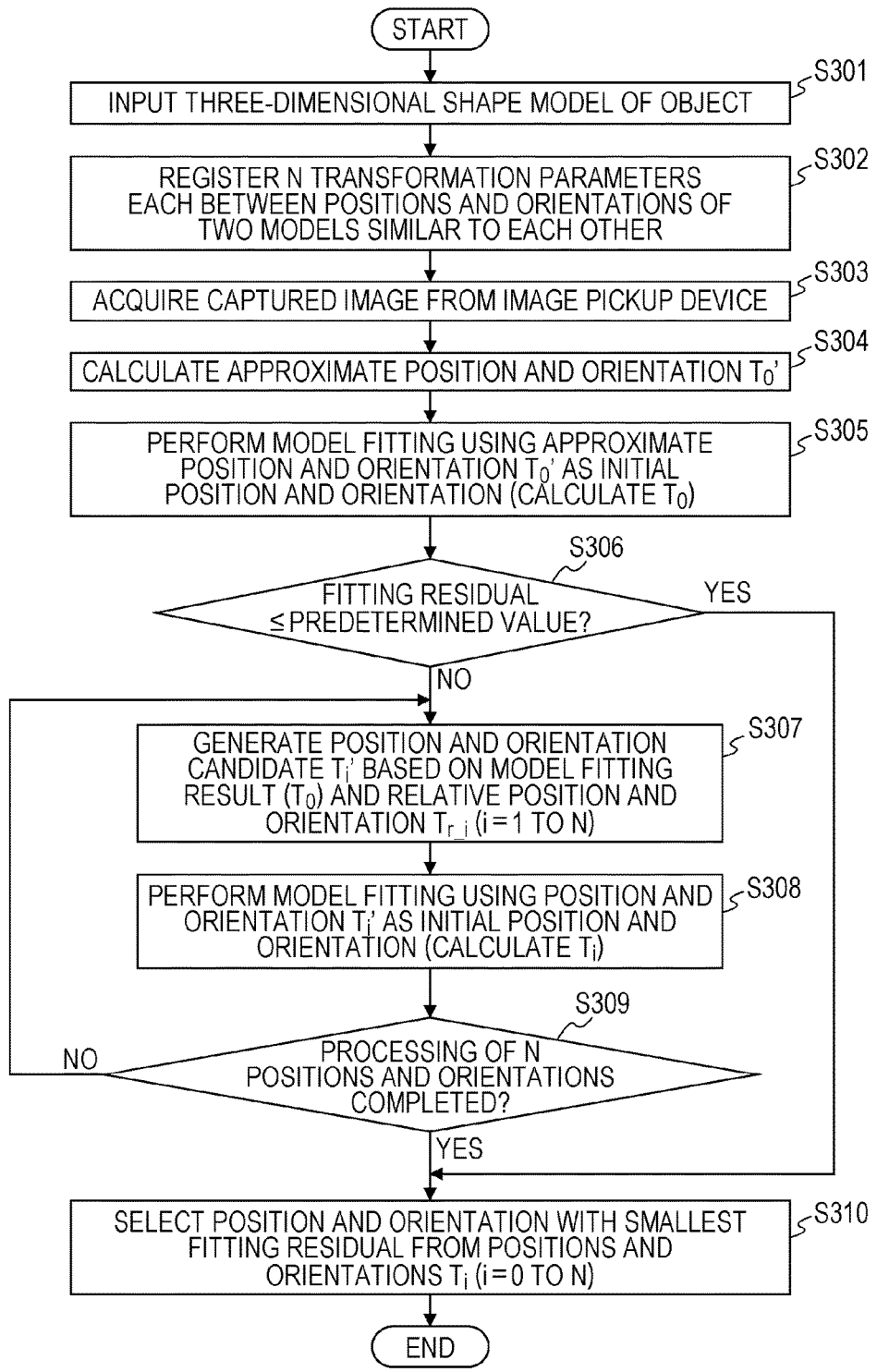

[Fig. 4]
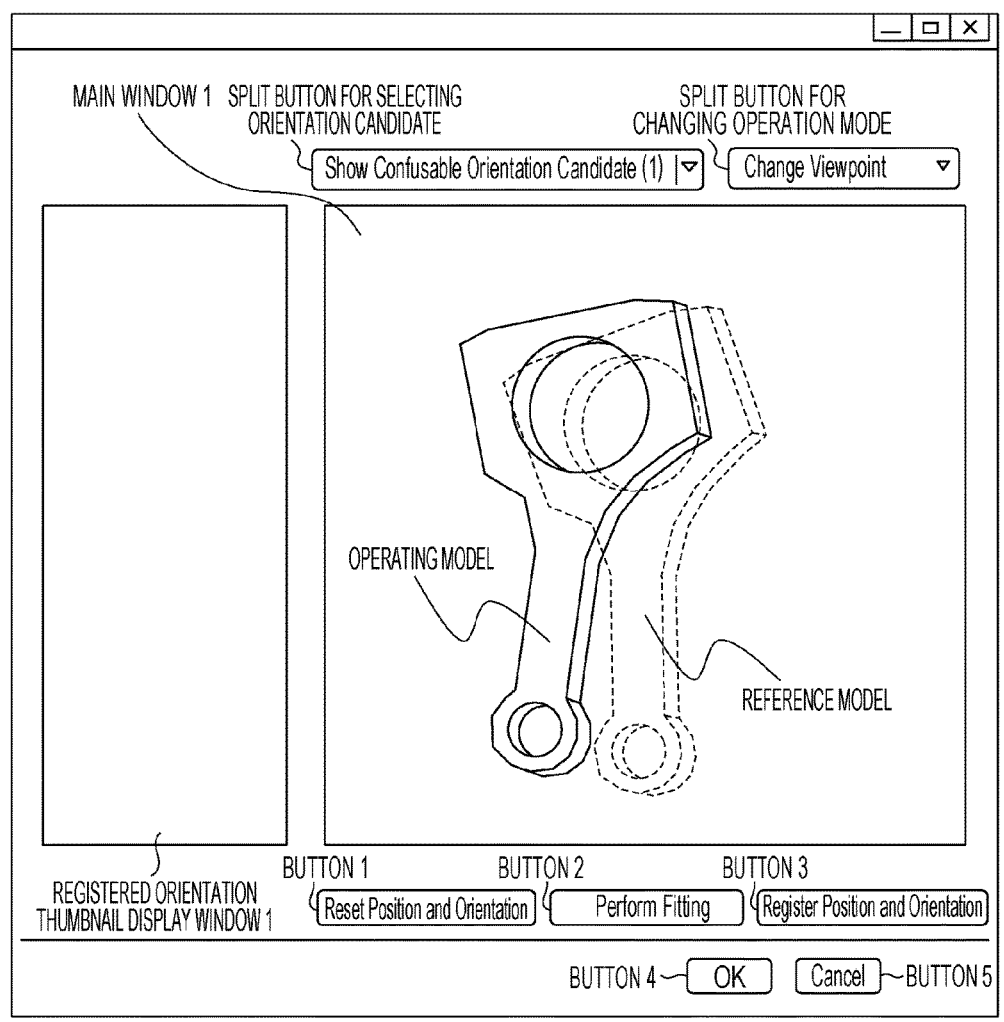

[Fig. 5]
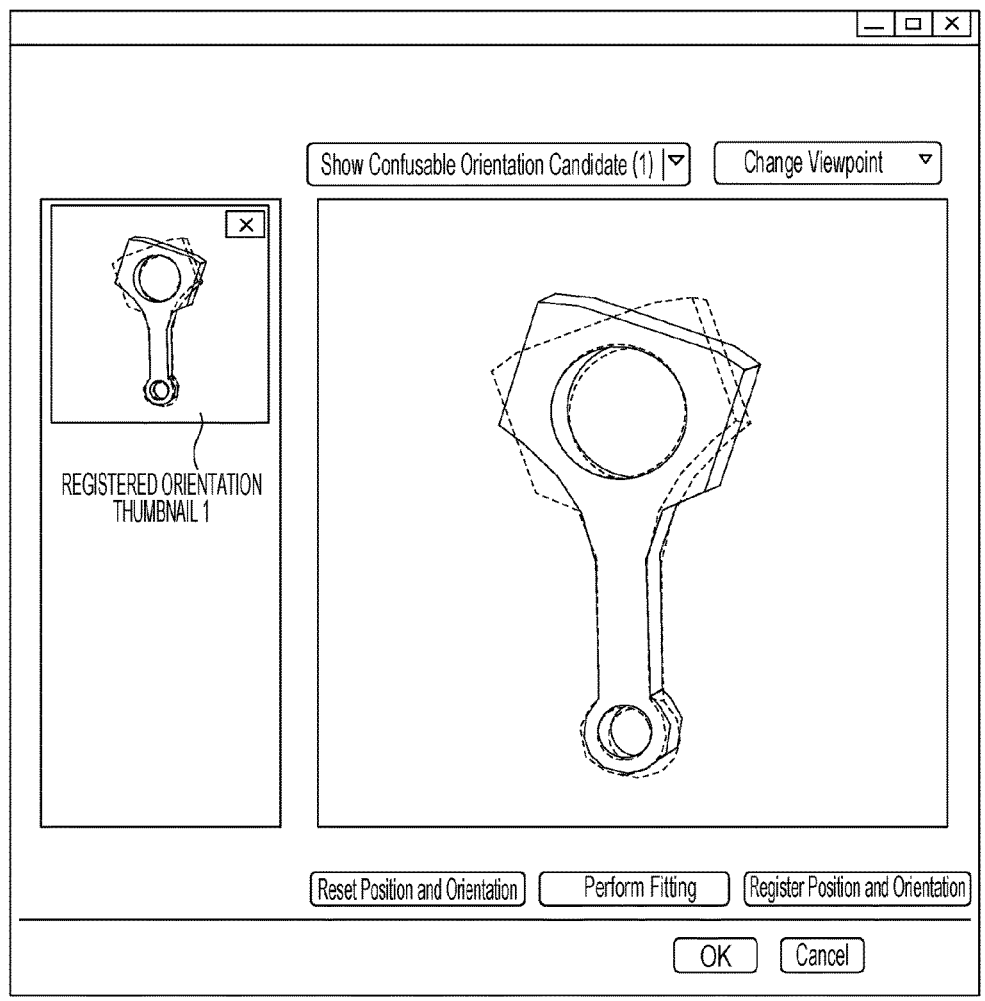
[Fig. 6A]
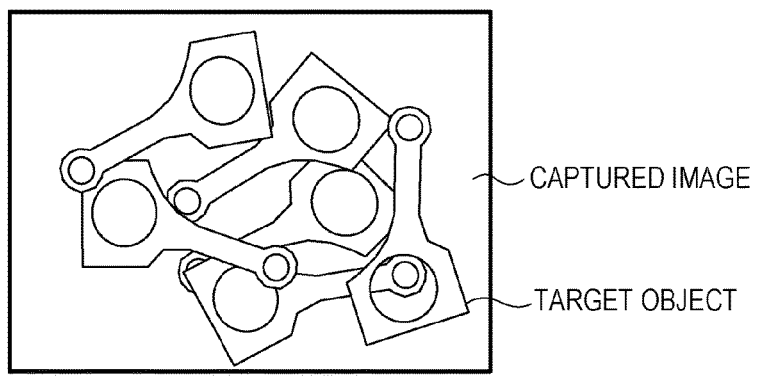

[Fig. 6B]
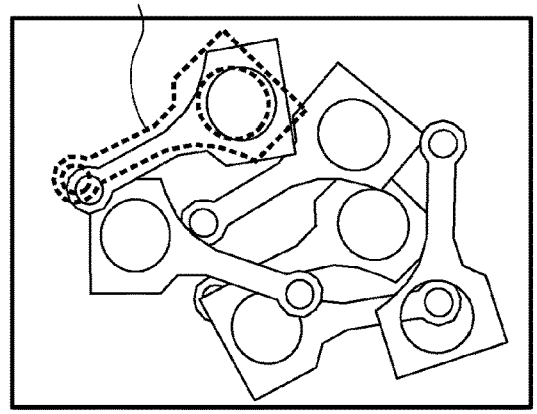
WORK PROJECTED BASED ON APPROXIMATE POSITION AND ORIENTATION $T_0'$
[Fig. 6C]
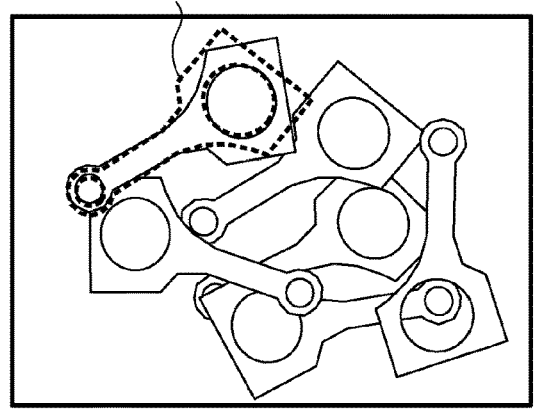
WORK PROJECTED BASED ON POSITION AND ORIENTATION $T_0$ AFTER FITTING
[Fig. 6D]
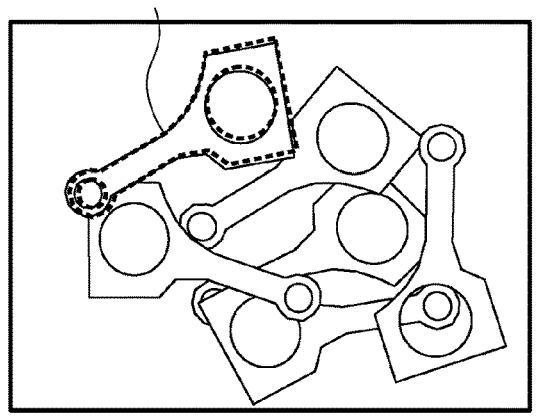
WORK PROJECTED BASED ON NEW CANDIDATE POSITION AND ORIENTATION $T_i'$

[Fig. 6E]
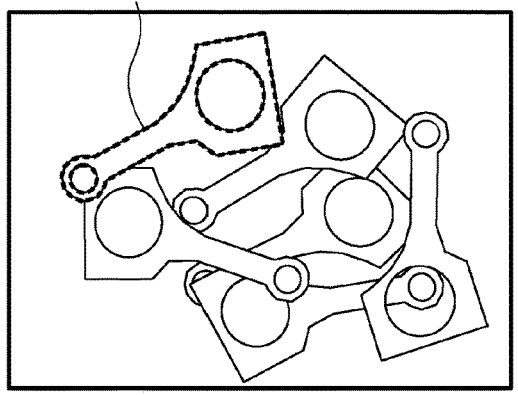
[Fig. 7A]
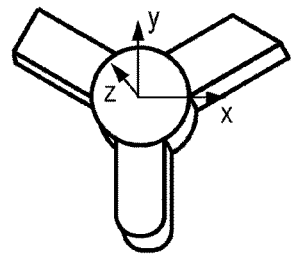
[Fig. 7B]
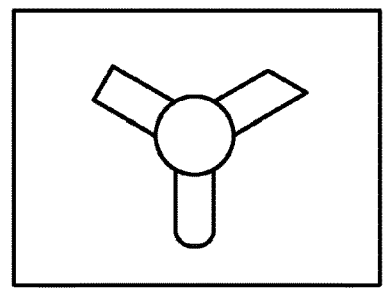
[Fig. 7C]
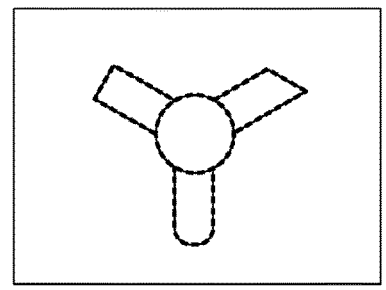

[Fig. 7D]
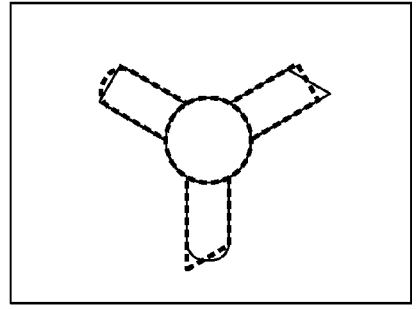
[Fig. 7E]
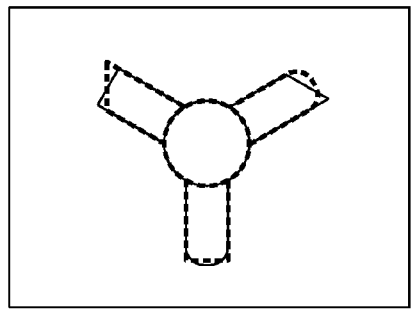
[Fig. 7F]
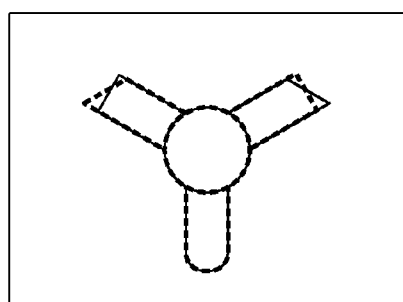
[Fig. 7G]
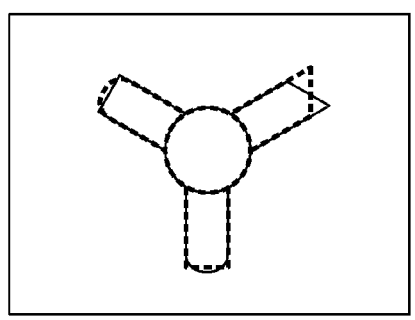

[Fig. 7H]
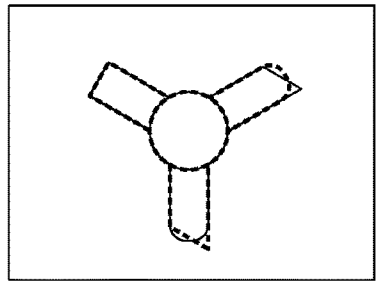
[Fig. 8]
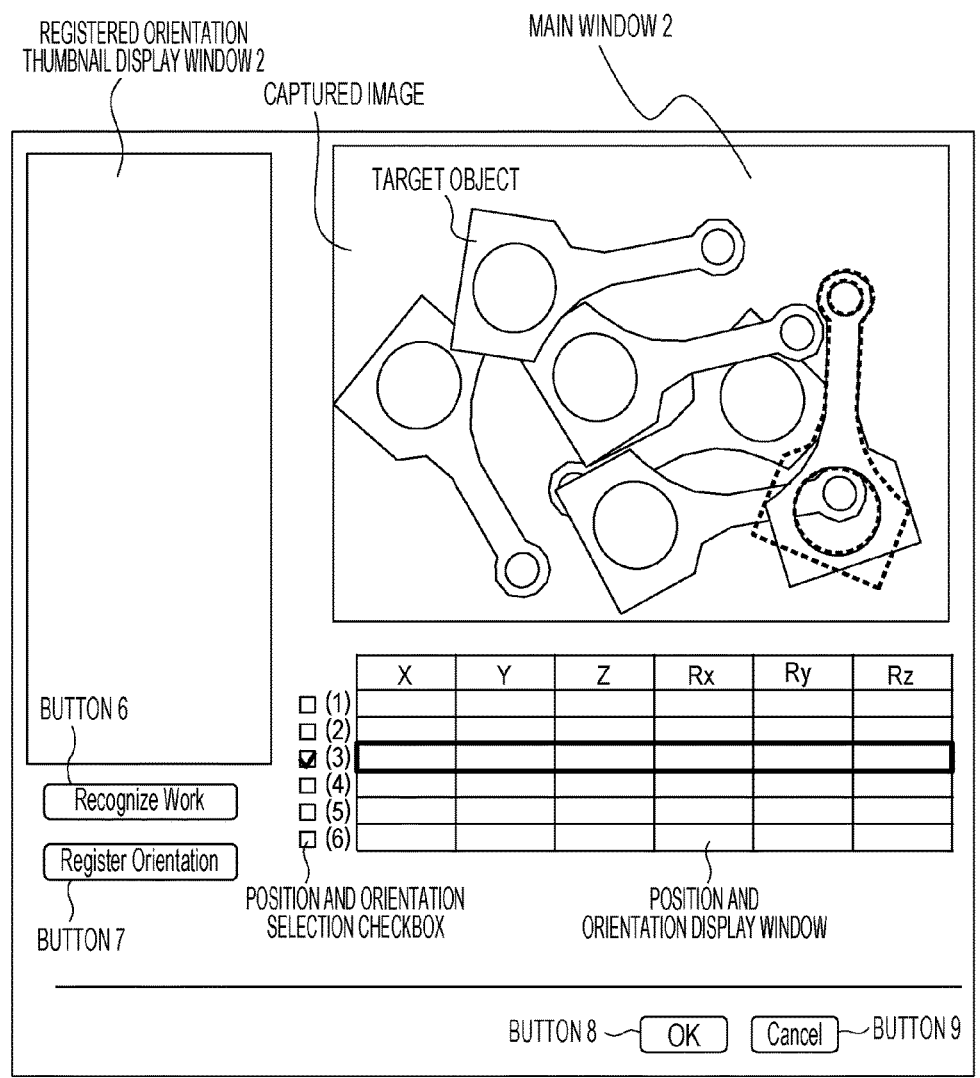

[Fig. 9]
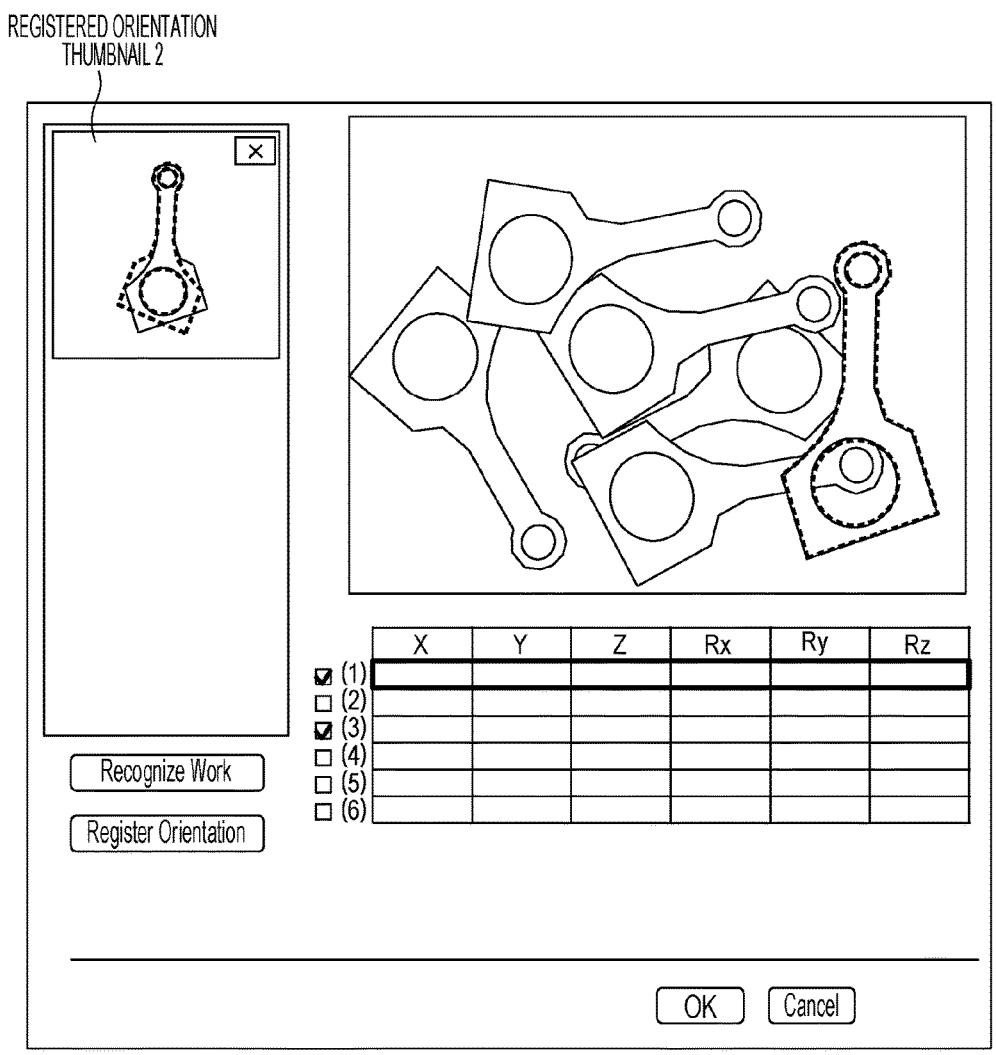

[Fig. 10]
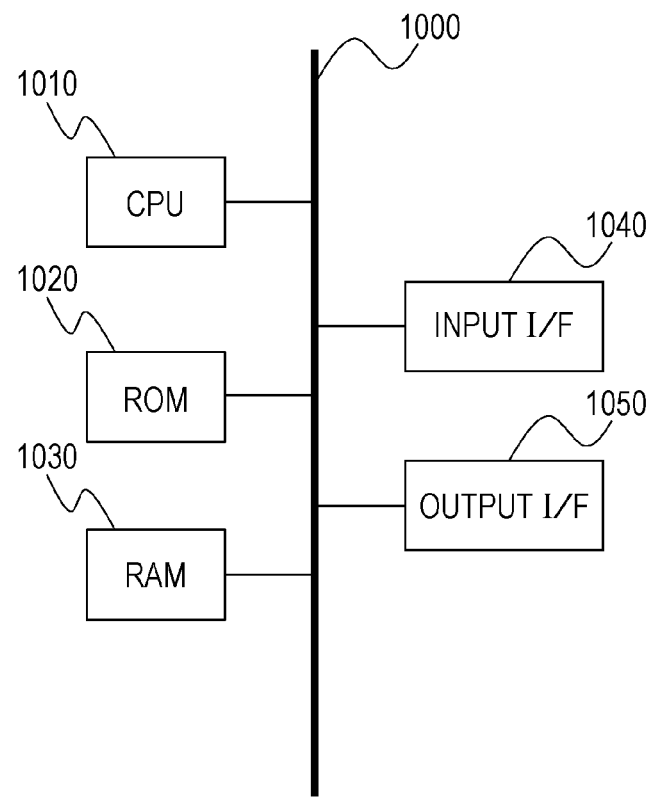

[Fig. 11]
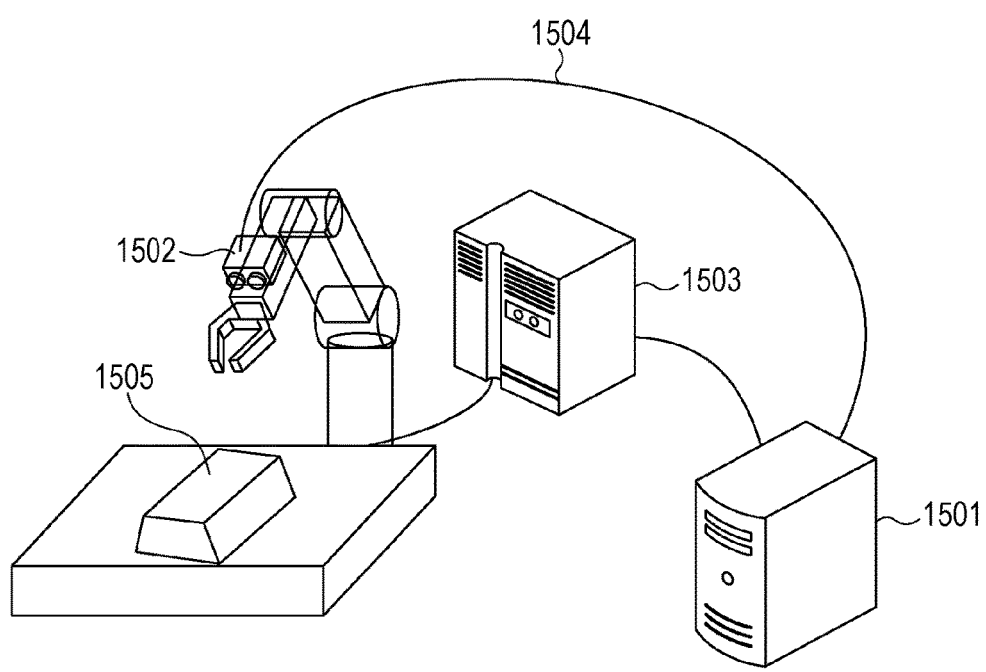

[Fig. 12]
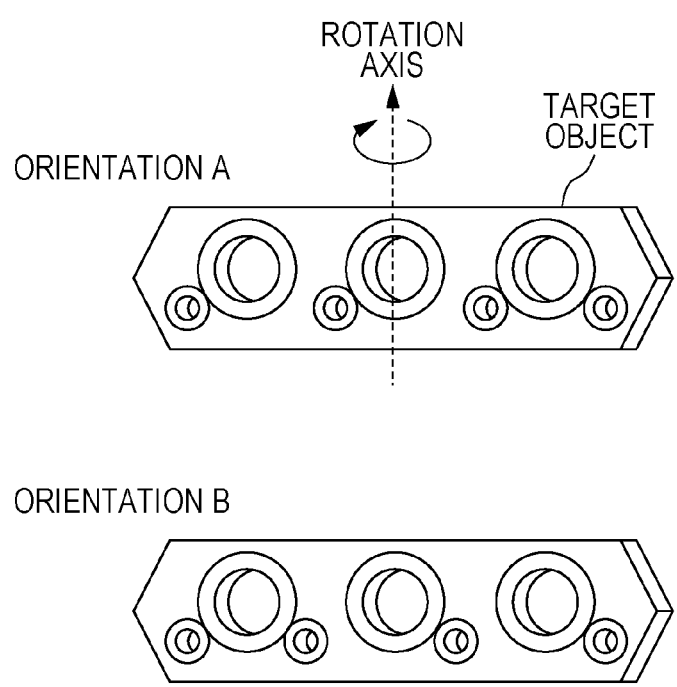

[Fig. 13]
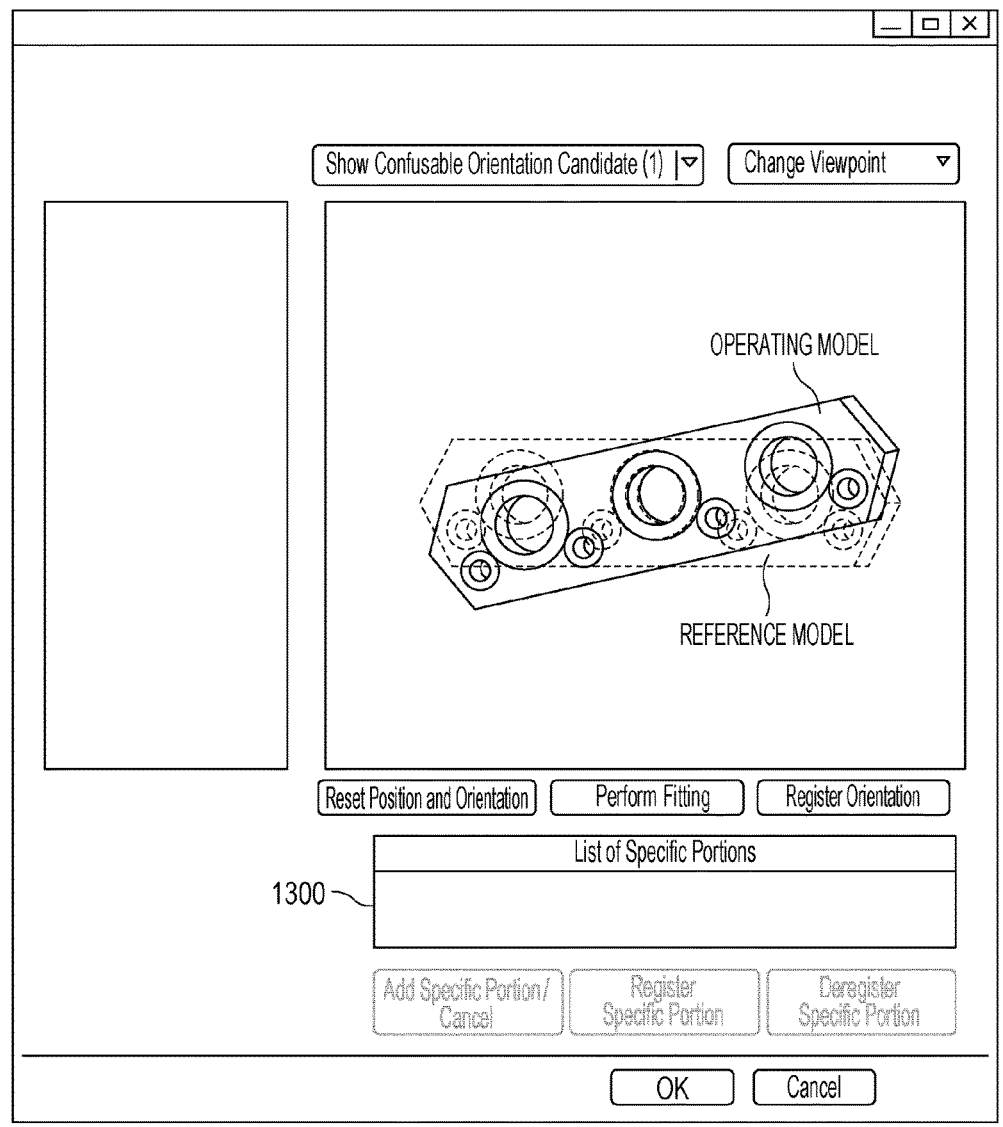

[Fig. 14]
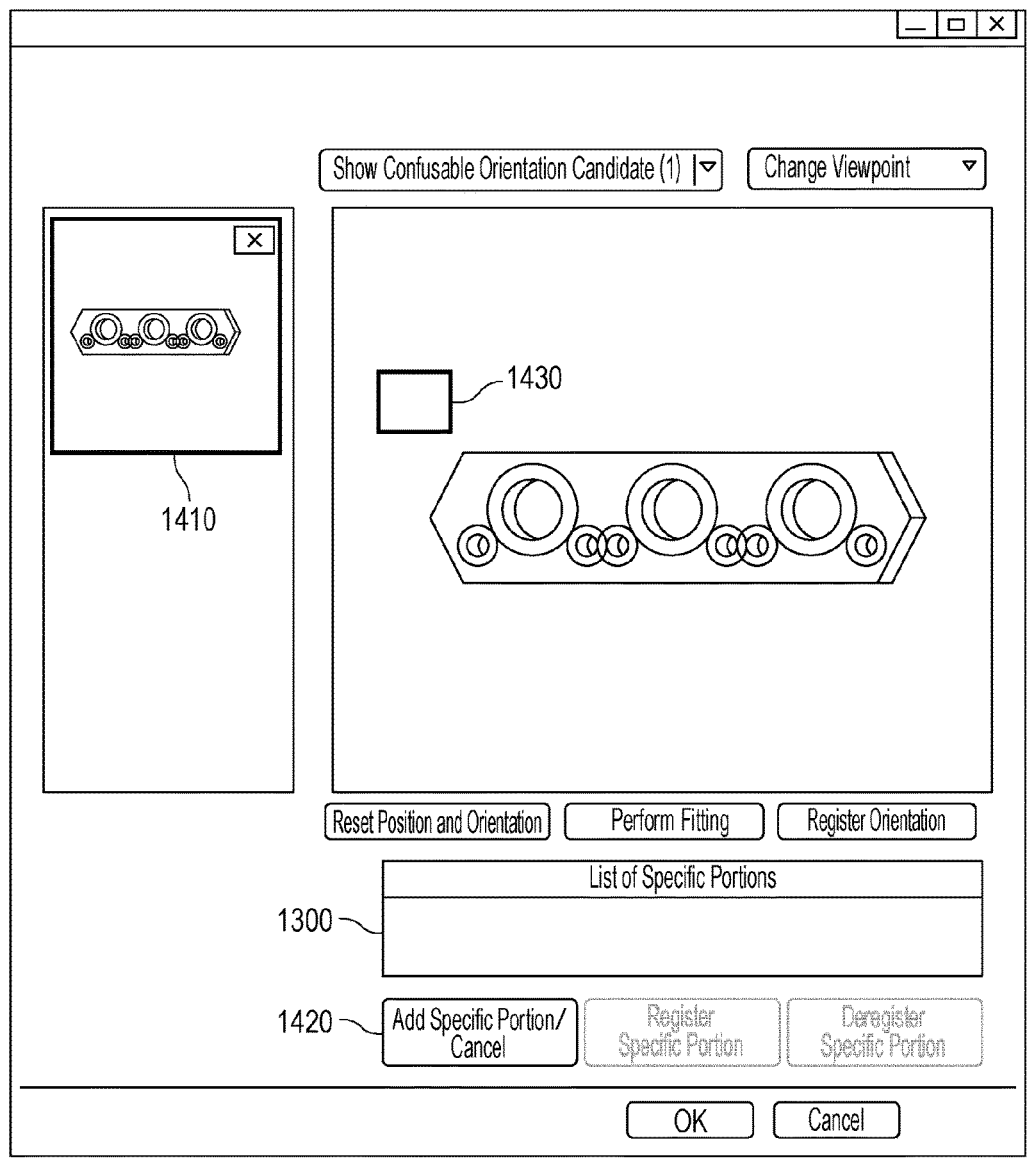

[Fig. 15]
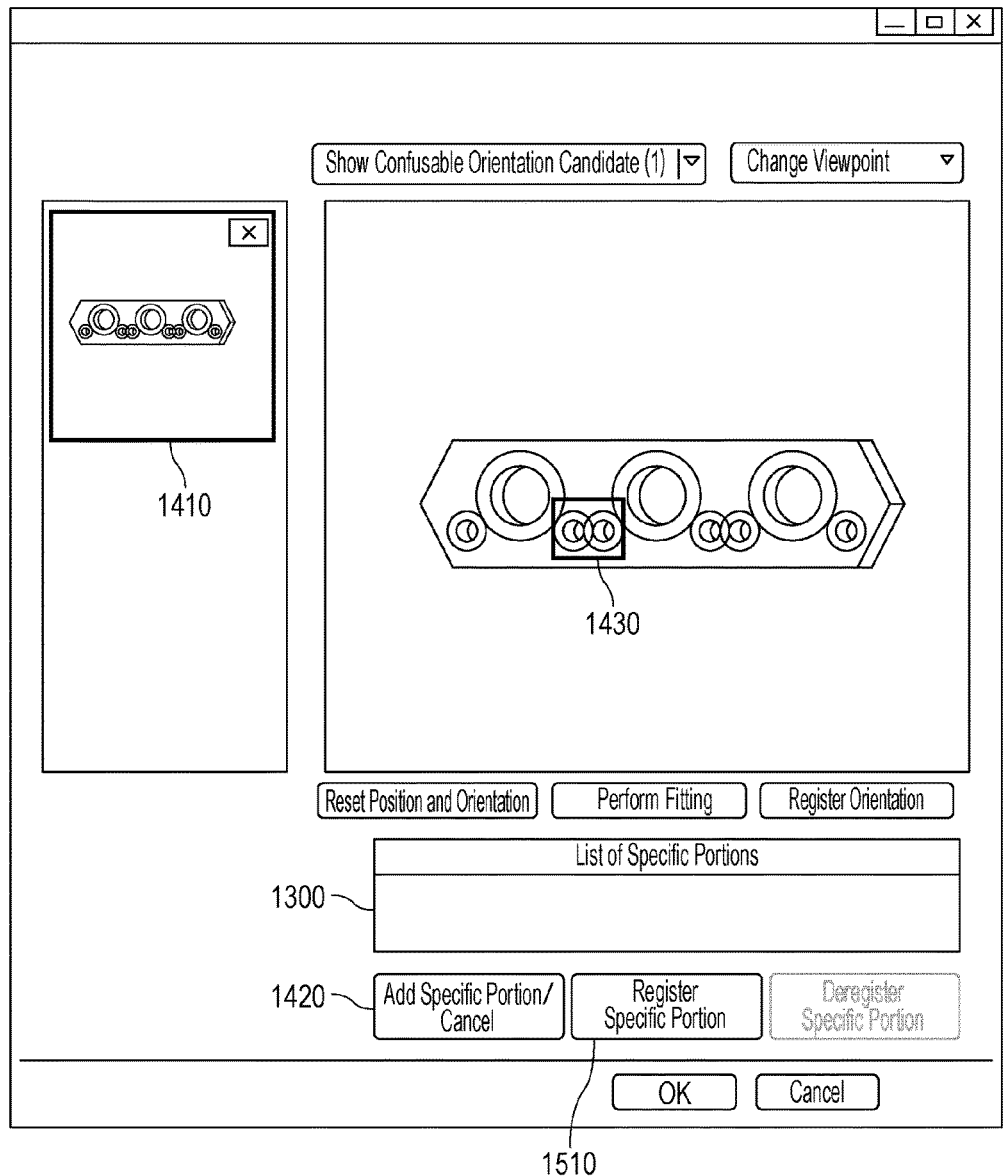

[Fig. 16]
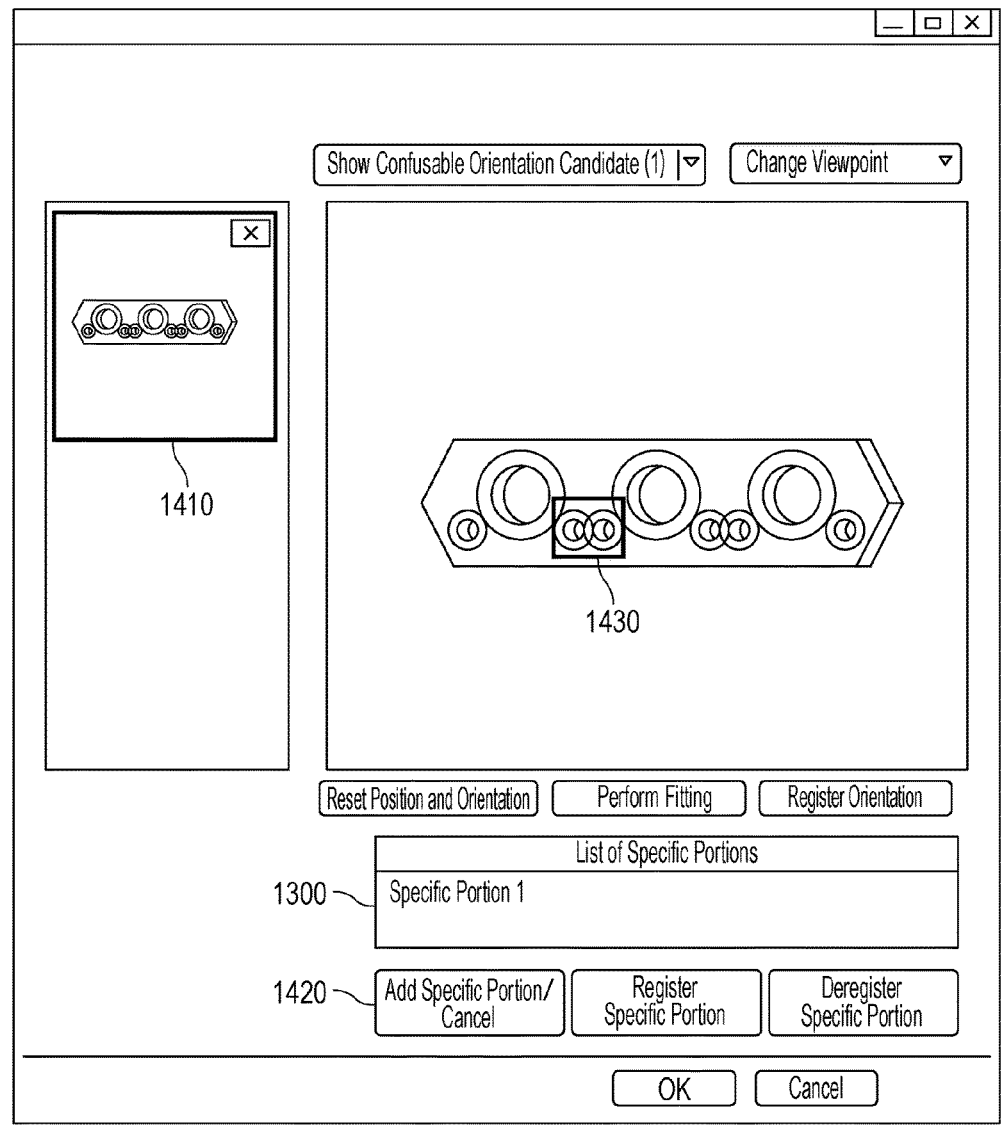

[Fig. 17]
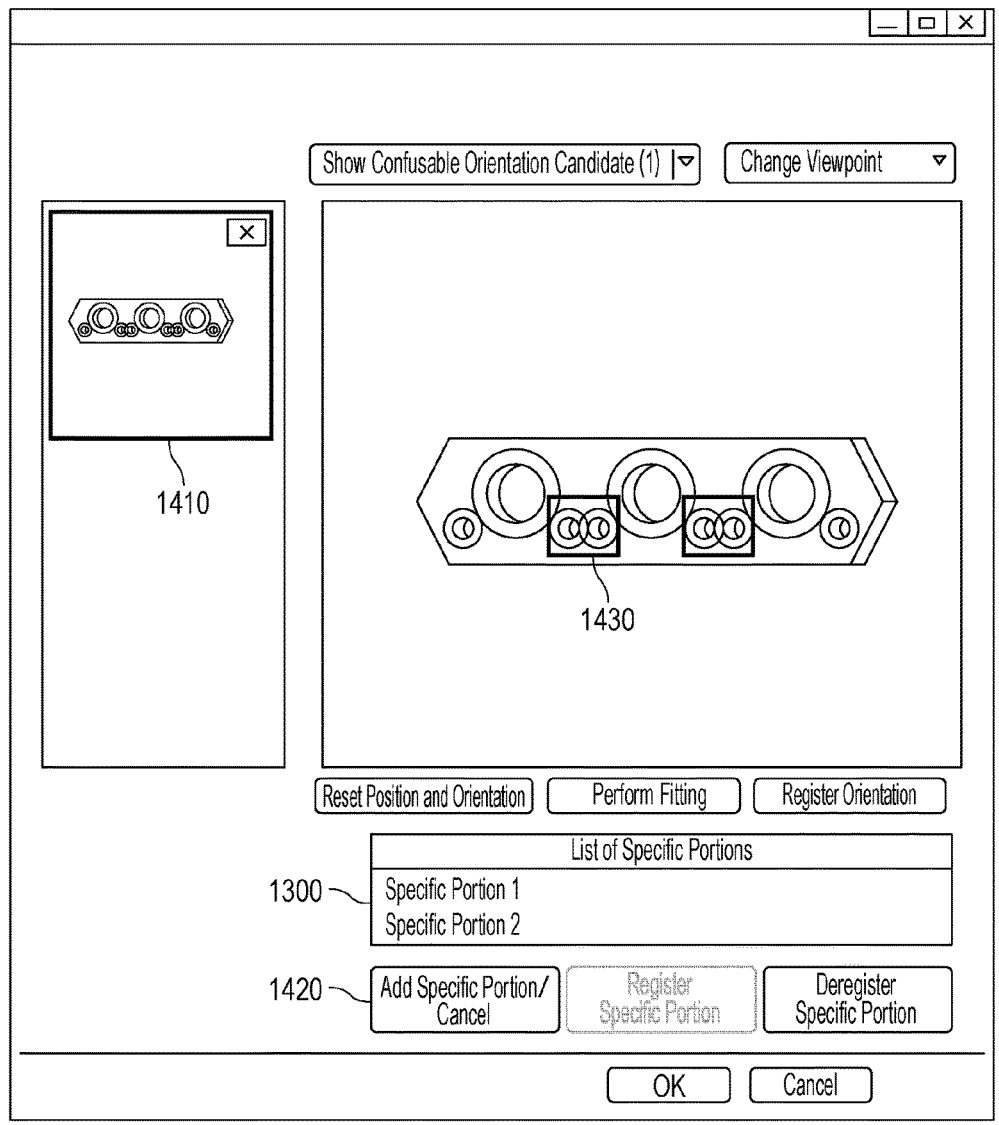

INFORMATION PROCESSING APPARATUS, INFORMATION PROCESSING METHOD, AND PROGRAM

TECHNICAL FIELD

The present invention relates to a technique for measuring a position and orientation of an object whose three-dimensional shape is already known.

BACKGROUND ART

A technique for use in production lines of factories or the like has been developed in recent years. The technique identifies an individual object from within a pile of objects using a vision system, measures a three-dimensional position and orientation of the identified object, and allows a hand attached to a robot to grasp the object.

As a technique for measuring a three-dimensional position and orientation of an object, there is a model fitting method that detects an approximate position and orientation of an individual object from a captured image of target objects, and fits a three-dimensional shape model of the object to image data by using the detected position and orientation as an initial value. With this method, if an appropriate position and orientation cannot be determined by the detection in the first stage, a correct position and orientation cannot be determined by the model fitting in the second stage. For example, in the case of an object whose front and back sides are similar in shape, assume that the position and orientation of the back side is erroneously detected in the detection described above during observation of the front side. In this case, model fitting using the detected position and orientation as an initial value converges to an incorrect solution, and a correct position and orientation cannot be calculated.

PTL 1 discloses a method which performs fitting from two orientations symmetrically placed and confusable with each other, and compares the results of the fitting to reduce erroneous recognition. Specifically, fitting is performed between a three-dimensional shape model and an image, and an axis which greatly contributes to orientation convergence (facilitates orientation convergence) in the fitting process is determined. Then, for a position and orientation calculated by the fitting, a position and orientation obtained by rotating the target object such that the orientation of the determined axis is reversed is generated as a new initial value to perform another fitting. The fitting results are compared, and the best result is selected to reduce erroneous recognition.

However, for an object whose two confusable positions and orientations are obtained by 180-degree rotation about an axis that facilitates orientation convergence (e.g., an object whose front and back sides are similar in shape, such as that illustrated in FIG. 2), a correct position and orientation cannot be determined by the method described in PTL 1.

When the method of PTL 1 is applied to this object, orientations obtained by reversing the axis in the longitudinal direction are generated as candidates. However, for the front side of the target object, if the position and orientation of the back side is determined in the detection in the first stage, a correct position and orientation cannot be calculated by fitting even when a new initial value is generated by the method of PTL 1.

Also, when an object has orientations confusable with each other, if each of the orientations converges in substantially the same manner in the fitting process, it is difficult to calculate the axis for the object, and thus is difficult to apply the method of PTL 1 to this object.

CITATION LIST

Patent Literature

PTL 1: Japanese Patent Laid-Open No. 2012-163450

SUMMARY OF INVENTION

Solution to Problem

An information processing apparatus described in the specification of the present application includes, for example, a model acquiring unit configured to acquire a three-dimensional shape model of a target object, a display control unit configured to cause a display unit to display the three-dimensional shape model, a setting unit configured to set a first orientation and a second orientation different from the first orientation on the basis of the three-dimensional shape model displayed in the display unit, a parameter deriving unit configured to derive a transformation parameter that transforms the first orientation into the second orientation, and a storage unit configured to store the transformation parameter.

With the technique described in the specification of the present application, it is possible to accurately acquire a position and orientation of a target object having a shape that is prone to be erroneously recognized.

Further features of the present invention will become apparent from the following description of exemplary embodiments with reference to the attached drawings.

BRIEF DESCRIPTION OF DRAWINGS

FIG. 1 illustrates a configuration of an information processing apparatus according to a first embodiment.

FIG. 2 illustrates a three-dimensional shape model of a target object according to the first embodiment.

FIG. 3 is a flowchart illustrating a procedure for calculating a transformation parameter, and also for calculating a position and orientation of a target object using the transformation parameter according to the first embodiment.

FIG. 4 shows a GUI for transformation parameter calculation according to the first embodiment.

FIG. 5 also shows the GUI for transformation parameter calculation according to the first embodiment.

FIG. 6A is a diagram for explaining a position and orientation calculation process for calculating a position and orientation of a target object according to the first embodiment.

FIG. 6B is another diagram for explaining the position and orientation calculation process according to the first embodiment.

FIG. 6C is another diagram for explaining the position and orientation calculation process according to the first embodiment.

FIG. 6D is another diagram for explaining the position and orientation calculation process according to the first embodiment.

FIG. 6E is another diagram for explaining the position and orientation calculation process according to the first embodiment.

FIG. 7A illustrates a three-dimensional shape model of a target object according to a modification of the first embodiment.

FIG. 7B illustrates a captured image of the target object.

FIG. 7C is a diagram for explaining transformation parameter calculation according to the modification of the first embodiment.

FIG. 7D is another diagram for explaining the transformation parameter calculation according to the modification of the first embodiment.

FIG. 7E is another diagram for explaining the transformation parameter calculation according to the modification of the first embodiment.

FIG. 7F is another diagram for explaining the transformation parameter calculation according to the modification of the first embodiment.

FIG. 7G is another diagram for explaining the transformation parameter calculation according to the modification of the first embodiment.

FIG. 7H is another diagram for explaining the transformation parameter calculation according to the modification of the first embodiment.

FIG. 8 shows a GUI for transformation parameter calculation according to a second embodiment.

FIG. 9 also shows the GUI for transformation parameter calculation according to the second embodiment.

FIG. 10 illustrates a hardware configuration of an information processing apparatus according to the present invention.

FIG. 11 illustrates a configuration of a third embodiment.

FIG. 12 illustrates a target object dealt with in a fourth embodiment.

FIG. 13 shows a GUI for registering a specific portion according to the fourth embodiment.

FIG. 14 also shows the GUI for registering a specific portion according to the fourth embodiment.

FIG. 15 also shows the GUI for registering a specific portion according to the fourth embodiment.

FIG. 16 also shows the GUI for registering a specific portion according to the fourth embodiment.

FIG. 17 also shows the GUI for registering a specific portion according to the fourth embodiment.

DESCRIPTION OF EMBODIMENTS

Embodiments of the present invention will now be described with reference to the attached drawings. The embodiments described below are each an example of the present invention and represent a configuration described in the appended claims.

Before description of each embodiment of the present invention, a configuration of hardware in which an information processing apparatus of each embodiment is implemented will be described with reference to FIG. 10.

FIG. 10 illustrates a hardware configuration of an information processing apparatus 100 according to an embodiment. Referring to FIG. 10, a central processing unit (CPU) 1010 controls an overall operation of each device connected via a bus 1000. The CPU 1010 reads and executes processing steps and programs stored in a read-only memory (ROM) 1020. An operating system (OS), each processing program according to the embodiment, device drivers, and the like are stored in the ROM 1020. They are temporarily stored in a random-access memory (RAM) 1030 and appropriately executed by the CPU 1010. An input interface (I/F) 1040 inputs data from an external device (e.g., image pickup device or operating device) as an input signal in such a format that the data can be processed by the information processing apparatus 100. An output I/F 1050 outputs data to an external device (e.g., display device) as an output signal in such a format that the data can be processed by the external device (e.g., display device).

First Embodiment

In a first embodiment, the present invention is applied to accurately determine a position and orientation of a target object (component) in a pile and grasp the target object with a robot hand on the basis of the determined position and orientation.

For a target object whose approximate position and orientation is prone to be erroneously recognized, two positions and orientations confusable with each other are set using a graphical user interface (GUI). Then, a transformation parameter between the two positions and orientations is registered. A method for accurately calculating a position and orientation will be described, which uses the registered transformation parameter to reduce erroneous recognition. A target object dealt with in the present embodiment is an object which is prone to be erroneously recognized when being rotated about a predetermined axis (for example, an object whose front and back sides are similar in shape).

Specifically, by using a GUI displayed in the display device 15, models are placed in two positions and orientations which are prone to be erroneously recognized, and a transformation parameter between the two positions and orientations is registered and held in advance. In position and orientation calculation, after fitting is performed once from an approximate position and orientation, a position and orientation confusable with the fitting result is generated. Then, another fitting is performed by using the generated position and orientation as an initial value. Then, of both the fitting results, a position and orientation with a higher evaluation value is adopted.

FIG. 1 illustrates a configuration of the information processing apparatus 100 according to the present embodiment. As illustrated in FIG. 1, the information processing apparatus 100 of the present embodiment includes a three-dimensional shape model holding unit 10, a transformation parameter calculating unit 11, an approximate position and orientation recognizing unit 12, and a position and orientation calculating unit 13 and is connected to an image pickup device 14, a display device 15, and an operating device 16. Although the image pickup device 14, the display device 15, and the operating device 16 are externally connected to the information processing apparatus 100 in the present embodiment, the image pickup device 14, the display device 15, and the operating device 16 may be included in the information processing apparatus 100.

Each component of the information processing apparatus 100 will now be described.

The three-dimensional shape model holding unit 10 holds a three-dimensional shape model of an object to be picked up from a pile of objects. For example, a polygonal model which approximately represents a three-dimensional shape of a target object can be used as the three-dimensional shape model. The polygonal model is formed by a combination of polygons. Each polygon is formed by positions (three-dimensional coordinates) of points in the surface of the target object and information about connection of the points for forming the polygon that approximates the surface. The polygon is generally a triangle, but may be a square or a pentagon. The polygonal model may be of any type that can approximately represent an object shape by using the three-dimensional coordinates of surface points and information about their connection. The three-dimensional shape model may be a model that represents a shape as a collection of segmented parametric curved surfaces, that is, by means of boundary representation (B-rep), such as computer-aided design (CAD) data. The three-dimensional shape model may be of any other type that can represent a three-dimensional shape of an object. The three-dimensional shape model is used to manipulate two models through the GUI in the display device 15 so as to register, in the approximate position and orientation recognizing unit 12, a relationship between orientations which are prone to be erroneously recognized. The three-dimensional shape model is also used by the position and orientation calculating unit 13 to measure the position and orientation of a target object. Note that a coordinate system (model coordinate system) serving as a reference for indicating the coordinates of points in the surface of the target object is set for the model in advance. FIG. 2 illustrates a target object dealt with in the present embodiment and a model coordinate system for the target object. The three-dimensional shape model holding unit 10 includes a memory or a hard disk, or may acquire a three-dimensional shape model from a storage medium or the like.

The transformation parameter calculating unit 11 displays a three-dimensional shape model of a target object in a virtual three-dimensional space and registers, through a user's manipulation, a relationship (transformation parameter) between two different positions and orientations confusable with each other. In the present embodiment, the transformation parameter calculating unit 11 sends a three-dimensional shape model held by the three-dimensional shape model holding unit 10 to the display device 15, and renders two three-dimensional shape models of the target object in the GUI of the display device 15. The transformation parameter calculating unit 11 receives a user's manipulation from the operating device 16 and places the two three-dimensional shape models in the confusable positions and orientations in the GUI of the display device 15. Then, the transformation parameter calculating unit 11 acquires the positions and orientations of the two models in the virtual three-dimensional space, and calculates and records the transformation parameter between the two positions and orientations to register (hold) the transformation parameter. The registered transformation parameter is input to the transformation parameter calculating unit 11. The GUI used here and the procedure of registration in the present embodiment will be described below. The transformation parameter calculating unit 11 inputs the registered transformation parameter to the position and orientation calculating unit 13.

The approximate position and orientation recognizing unit 12 acquires a three-dimensional shape model of a target object from the three-dimensional shape model holding unit 10. Also, the approximate position and orientation recognizing unit 12 acquires images (grayscale and range images) from the image pickup device 14. In the present embodiment, the images contain a pile of target objects. The approximate position and orientation recognizing unit 12 detects an individual object in the pile of objects appearing in a three-dimensional model image, and calculates an approximate position and orientation of the object with respect to the image pickup device 14 to recognize the approximate position and orientation of the individual object. A three-dimensional coordinate system (reference coordinate system) serving as a reference for position and orientation measurement is defined for the image pickup device 14.

In the present embodiment, a coordinate system where the center of a sensor used as the image pickup device 14 is the origin, the horizontal direction of an acquired image is the x-axis, the vertical direction of the image is the y-axis, and the optical axis of the sensor is the z-axis is defined as a reference coordinate system. The position and orientation of an object with respect to the image pickup device 14 is the position and orientation of the object in the reference coordinate system. In the present embodiment, an approximate position and orientation of an individual object is calculated by performing pattern matching on grayscale and range images acquired by the sensor, by using images obtained through observations from multiple viewpoints as templates. The approximate position and orientation may be recognized by other methods. That is, any other methods can be used, as long as they can discover an individual object in a pile of objects and calculate a three-dimensional position and orientation of the discovered object. The present embodiment deals with an object which is prone to be erroneously recognized when being rotated about a predetermined axis. Therefore, the approximate position and orientation acquired here is highly likely to be erroneously recognized. The position and orientation calculated by the approximate position and orientation recognizing unit 12 is input as an approximate position and orientation to the position and orientation calculating unit 13.

The position and orientation calculating unit 13 acquires a three-dimensional shape model from the three-dimensional shape model holding unit 10. The position and orientation calculating unit 13 also acquires an approximate position and orientation from the approximate position and orientation recognizing unit 12. The position and orientation calculating unit 13 also acquires a transformation parameter held by the transformation parameter calculating unit 11. The position and orientation calculating unit 13 also acquires measurement information (grayscale and range images) from the image pickup device 14. From the acquired information, the position and orientation calculating unit 13 calculates the position and orientation of the target object.

Specifically, first, on the basis of the acquired approximate position and orientation, the position and orientation calculating unit 13 calculates (derives) the position and orientation of the three-dimensional shape model that best fits the target object in the image acquired by the image pickup device 14. Then, on the basis of the acquired transformation parameter, the position and orientation calculating unit 13 determines a position and orientation confusable with the calculated position and orientation, and performs another fitting using the determined position and orientation as an initial value. Then, the position and orientation calculating unit 13 compares evaluation values of the fitting results, and outputs a position and orientation with a better evaluation value as a final result. Fitting is performed, for example, by correcting the position and orientation such that the three-dimensional shape model of the target object fits the measurement information (grayscale and range images) acquired by the sensor. Other fitting methods may also be used. For example, fitting may be performed using only one of the range and grayscale images.

The image pickup device 14 is a sensor that acquires measurement information necessary to recognize the position and orientation of a target object. For example, the image pickup device 14 may be a camera that captures a two-dimensional image, a range sensor that captures a range image composed of pixels each having depth information, or may be a combination of both. The range sensor may be one that captures laser light or slit light reflected from a target with a camera, and measures the distance using triangulation. The range sensor may be of a time-of-flight type that uses the time of flight of light, or may be one that calculates the distance using triangulation from an image captured by a stereo camera. Any sensor capable of acquiring information necessary to recognize a three-dimensional position and orientation of an object can be used without sacrificing the essence of the present invention.

The image pickup device 14 may be secured above or beside the target object, or may be attached to a robot hand. In the present embodiment, a sensor capable of acquiring both range and grayscale images is used as the image pickup device 14. As described above, measurement information acquired by the image pickup device 14 is input to the approximate position and orientation recognizing unit 12 and the position and orientation calculating unit 13. Hereinafter, a coordinate system set in the image pickup device 14 will be referred to as a sensor coordinate system.

The display device 15 acquires a three-dimensional shape model from the three-dimensional shape model holding unit 10 through the transformation parameter calculating unit 11, and displays the acquired three-dimensional shape model. The display device 15 may display an image acquired from the image pickup device 14 or a position and orientation calculated by the position and orientation calculating unit 13 to allow the user to check it. For example, a liquid crystal display or a cathode-ray tube (CRT) display is used as the display device 15.

The operating device 16 includes a keyboard and a mouse, and is used to input an instruction from the user. In particular, the mouse is used to manipulate the GUI.

FIG. 3 is a flowchart illustrating a procedure for calculating a position and orientation of a target object according to the present embodiment.

Step S301

In step S301, the transformation parameter calculating unit 11 and the position and orientation calculating unit 13 acquire a three-dimensional shape model of a target object from the three-dimensional shape model holding unit 10.

Step S302

In step S302, the transformation parameter calculating unit 11 registers a relationship (transformation parameter) between two different positions and orientations (first and second orientations) confusable with each other. The present embodiment uses a GUI to perform the operation of each step.

FIG. 4 shows an example of the GUI used to register a transformation parameter.

Each of functions forming the GUI and a method for registering a transformation parameter will now be described. Through the transformation parameter calculating unit 11, the user manipulates the GUI using the operating device 16 (e.g., mouse or keyboard).

The three-dimensional shape model holding unit 10 sends a three-dimensional shape model through the transformation parameter calculating unit 11 to the display device 15, which displays two acquired three-dimensional shape models placed in a virtual space. Specifically, a virtual camera representing the image pickup device 14 is placed in the virtual space, a position and orientation which allows the virtual camera to observe the entire target object is calculated, and two three-dimensional shape models are placed in the calculated position and orientation.

One of the two displayed models is defined as a reference model, and the other model is defined as an operating model. The position or orientation of one of the two displayed models may be displaced from the other model. This is because if the two displayed models completely overlap each other in the initial display, it is difficult to see that there are two models. Then, an observation image obtained by the virtual camera is rendered and displayed on the display screen of the display device 15.

For easy viewing of the degree of overlapping, the two models may be rendered in different colors and at least one of them may be displayed in a semi-transparent state. A set of the positions and orientations of the virtual camera, the reference model, and the operating model in the initial display is recorded as initial placement. By pressing button 1, the user can restore the initial placement on the display screen at any time.

By allowing the user of the information processing apparatus 100 to manipulate the operating model displayed on the display screen of the display device 15, the operating model is superimposed on the reference model in a position and orientation different from that of the reference model in such a manner that the operating model is similar in appearance to the reference model. Pressing a split button for changing the operation mode shows two modes "Change Viewpoint" and "Manipulate Model" as candidates. This allows the user to select one of the candidates and switch the current mode to the selected one. In "Manipulate Model" mode, the user can manipulate the position and orientation of the operating model in the three-dimensional space with the mouse. For example, dragging with the left mouse button allows a translational movement of the model in a plane perpendicular to the camera optical axis, dragging with the right mouse button allows rotation of the model, and turning the mouse wheel allows zooming in or out of the model (i.e., a translational movement of the model along the camera optical axis). Thus, the operating model is superimposed on the reference model in an orientation different from that of the reference model in such a manner that the operating model is similar in appearance to the reference model.

In "Change Viewpoint" mode, the user can change the position and orientation of the virtual camera with the mouse. As in "Manipulate Model" mode, dragging with the left mouse button allows a translational movement of the model in a plane perpendicular to the camera optical axis, dragging with the right mouse button allows rotation of the model, and turning the mouse wheel allows a translational movement of the model along the camera optical axis. Thus, the user can three-dimensionally check the degree of overlapping between the operating model and the reference model.

Note that "Manipulate Model" mode and "Change Viewpoint" mode described herein may be provided in other ways. For example, a mode change may be made by selecting a radio button, instead of using a split button. An operation in each mode may be performed by a combination of key binding and mouse action. Specifically, an operation in "Change Viewpoint" mode may be done by moving the mouse while holding down the Ctrl key, and an operation in "Manipulate Model" mode may be done by moving the mouse without holding down any keys. Instead of using the mouse, a touch panel may be used to manipulate the model.

Specifically, dragging a three-dimensional shape model region on the touch panel allows a translational movement of the model in a plane perpendicular to the camera optical axis, dragging a background region allows rotation of the model, and pinching in or out allows zooming out or in of the model. Any other methods may be used, as long as the reference model and the operating model can be placed in different positions and orientations in such a manner that they are similar in appearance.

Button 2 is used to call a support function that assists the user in manipulating the model. When button 2 is pressed, the position and orientation calculating unit 13 calculates a position and orientation obtained by moving the operating model from the position and orientation at the press of button 2 to fit it to the reference model, and updates the placement of the operating model. Specifically, fitting of the reference model and the operating model (three-dimensional shape models) is performed by uniformly sampling points (a group of points) from the surface of each three-dimensional shape model and using Iterative Closest Point (ICP). The fitting method is not limited to this.

For example, like main window 1, an observation image plane of the virtual camera is prepared, and an image which renders only a reference model is generated in the image plane. Then, a color buffer and a depth buffer are acquired from a frame buffer for storing the resulting image. The two acquired buffers may be used as a brightness image and a range image to perform fitting of the operating model to these images by the same method as that used in the position and orientation calculating unit 13. Any other methods may be used as long as they allow fitting of the operating model to the reference model.

A split button for selecting an orientation candidate is used to call a support function that assists the user in manipulating the model. It is difficult and cumbersome for the user to manipulate two models and place them in an overlapping manner in the three-dimensional space. Therefore, some positions and orientations in which the operating model may be similar in appearance to the reference model are calculated as candidates in advance. The user selects a candidate from the split button to place the operating model in the selected position and orientation.

The user performs the model manipulation on the basis of the placement of the operating model and the reference model displayed in the three-dimensional space. The present embodiment determines the first, second, and third axes as principal components of the distribution of points (group of points) uniformly sampled from the surface of the three-dimensional shape model, rotates the reference model 180 degrees about each of the axes, and allows each of the resulting orientations to be selected as a position and orientation candidate for the operating model. Thus, for a substantially planar object with two principal planes, one being the front and the other being the back, which are prone to be erroneously recognized, orientations obtained by reversing the front and back of the object can be generated as candidates.

The method for generating position and orientation candidates is not limited to this. For example, positions and orientations obtained by rotating the reference model 180 degrees about each of the X, Y, and Z axes of the model coordinate system may be used as position and orientation candidates. Another method may be to generate many positions and orientations by rotating the reference model about each of the X, Y, and Z axes in 30-degree increments, place the operating model in each position and orientation, and generate candidates from the result of fitting to the reference model performed using the fitting function described above. In this case, when a result obtained by making the operating model coincide with the reference model is a true value, if a position and orientation of the operating model obtained by fitting the operating model to the reference model has substantially the same evaluation value as the true value even though the position and orientation is different from the true value, the position and orientation is adopted as a candidate.

The position and orientation is determined to be different from the true value when, for example, a transformation from the orientation obtained as a result of fitting to the true value (orientation) is 10 degrees or more when represented by a rotation angle about the rotation axis.

A determination as to whether evaluation values are substantially the same can be made, for example, by using an ICP residual, that is, a mean value of point-to-point distances in the result of fitting. In this case, if the mean value of point-to-point distances is a predetermined value or less, the resulting position and orientation is used as a candidate.

Alternatively, if the ratio of three-dimensionally overlapping parts of the reference model and the operating model after fitting is calculated to be 90% or more, the position and orientation after the fitting may be adopted as a candidate. Any other methods may be used as long as two positions and orientations confusable with each other can be generated as candidates.

By using the functions described above, the operating model is superimposed on the reference model in a position and orientation different from that of the reference model in such a manner that the operating model is similar in appearance to the reference model. Then, button 3 is used to call a function that calculates a transformation parameter between the two models and adds the transformation parameter to a list. This function will be described with reference to FIG. 5.

The display screen in FIG. 5 shows an example where, by using the functions described above, the operating model is superimposed on the reference model in a position and orientation different from that of the reference model in such a manner that the operating model is similar in appearance to the reference model. When button 3 (see FIG. 4) is pressed in this state, a transformation parameter between the two three-dimensional shape models is calculated on the basis of the position and orientation of the reference model with respect to the virtual camera at this point and the position and orientation of the operating model with respect to the virtual camera at this point.

Model coordinate systems set for the two three-dimensional shape models, the reference model and the operating model, are referred to as a reference model coordinate system and an operating model coordinate system. Also, a coordinate system set for the virtual camera is referred to as a virtual camera coordinate system. The virtual camera coordinate system is set in the same manner as the reference coordinate system for the image pickup device 14. Here, a three-by-three rotation matrix that performs an orientation transformation from the reference model coordinate system to the virtual camera coordinate system is represented by $R_{VB}$, and a three-column translation vector that performs a position transformation from the reference model coordinate system to the virtual camera coordinate system is represented by $t_{VB}$. The transformation from the reference model coordinate system $X_V = [X_V, Y_V, Z_V]^T$ to the virtual camera coordinate system $X_B = [X_B, Y_B, Z_B]^T$ can be expressed using a four-by-four matrix $T_{VB}$ as follows:

$$X_V = T_{VB} X_B',$$

where $X_V' = [X_V, Y_V, Z_V, 1]^T$, $X_B' = [X_B, Y^B, Z_B, 1]^T$, and $$T_{VB} = \begin{bmatrix} R_{VB} & t_{VB} \\ 0^T & 1 \end{bmatrix} \qquad \text{[Math. 1]}$$

Hereinafter, $T_{VB}$ will be referred to as a reference model position and orientation (first position and orientation).

A three-by-three rotation matrix that performs an orientation transformation from the operating model coordinate system to the virtual camera coordinate system is represented by $R_{VO}$, and a three-column translation vector that performs a position transformation from the operating model coordinate system to the virtual camera coordinate system is represented by $t_{VO}$. The transformation from the operating model coordinate system $X_O = [X_O, Y_O, Z_O]^T$ to the virtual camera coordinate system $X_V = [X_V, Y_V, Z_V]^T$ can be expressed using a four-by-four matrix $T_{VO}$ as follows:

$$X_V' = T_{VO} X_O',$$

where $X_O' = [X_O, Y_O, Z_O, 1]^T$, $X_V' = [X_V, Y_V, Z_V, 1]^T$, and $$T_{VO} = \begin{bmatrix} R_{VO} & t_{VO} \\ 0^T & 1 \end{bmatrix} \quad \text{[Math. 2]}$$

Hereinafter, $T_{VO}$ will be referred to as an operating model position and orientation (second position and orientation).

A relative position and orientation $T_r$ between the two three-dimensional shape models is determined from the reference model position and orientation $T_{VB}$ and the operating model position and orientation $T_{VO}$. The relative position and orientation $T_r$ can be determined by the equation $T_r = (T_{VB})^{-1} T_{VO}$. The relative position and orientation $T_r$ can be expressed by six parameters in total, three parameters representing the position and three parameters representing the orientation. Values of the six parameters representing a position and orientation are acquired from $T_r$, and a set of these values is added as a transformation parameter to a list. Instead of values of the six parameters, a set of values of 16 parameters forming a four-by-four matrix may be used as a transformation parameter. Alternatively, a set of six parameters representing a position and orientation of the reference model and six parameters representing a position and orientation of the operating model may be used as a transformation parameter. Any other parameters may be used as a transformation parameter as long as the relative position and orientation $T_r$ of the reference model and the operating model can be restored, that is, as long as the positions and orientations of the two models can be transformed to each other. Only three parameters representing an orientation may be used as a transformation parameter.

Upon completion of the addition of the transformation parameter to the list, a screen-capture image of main window 1 obtained when button 3 is in the down state is displayed as a thumbnail (registered orientation thumbnail 1) in registered orientation thumbnail display window 1. The thumbnail is associated with the transformation parameter registered in the list. Thus, pressing the "X" button in the upper right corner of the thumbnail allows the user to delete the registered transformation parameter from the list.

As described above, only one transformation parameter is registered in the present embodiment. However, if there are a plurality of orientations confusable in appearance, the operation described above may be executed multiple times to calculate each transformation parameter and add it to the list. This will be described as a modification later on.

Buttons 4 and 5 (see FIG. 4) are used to end the operation of transformation parameter registration. When button 4 is pressed, N transformation parameters added to the list so far are input to the position and orientation calculating unit 13. When button 5 is pressed, all N transformation parameters added to the list so far are discarded.

A transformation parameter registering method using a GUI has been described. The GUI described herein is an example, and other GUIs may be used.

The operation in each of steps S303 to S310 in FIG. 3 will now be described with reference to FIGS. 6A to 6E.

Step S303

In step S303, the approximate position and orientation recognizing unit 12 and the position and orientation calculating unit 13 acquire picked-up range and grayscale images of target objects from the image pickup device 14 through an interface. FIG. 6A shows the captured image.

Step S304

In step S304, the approximate position and orientation recognizing unit 12 detects an individual object in a pile of target objects appearing in the captured image, calculates six parameters representing an approximate position and orientation of the detected target object in the sensor coordinate system, and records them. In a coordinate transformation from the model coordinate system based on the six calculated parameters to the sensor coordinate system, a three-by-three rotation matrix expressed by three parameters representing the orientation is represented by $R_{SM}$, and a three-column translation vector expressed by three parameters representing the position is represented by $t_{SM}$. In this case, a transformation from a robot coordinate system $X_M = [X_M, Y_M, Z_M]^T$ to a work coordinate system $X_S = [X_S, Y_S, Z_S]^T$ can be expressed using a four-by-four matrix $T_0'$ as follows:

$$X_S' = T_0' X_M',$$

where $X_S' = [X_S, Y_S, Z_S, 1]^T$, $X_M' = [X_M, Y_M, Z_M, 1]^T$, and $$T_0' = \begin{bmatrix} R_{SM} & t_{SM} \\ 0^T & 1 \end{bmatrix} \quad \text{[Math. 3]}$$

Hereinafter, $T_0'$ will be referred to as an approximate position and orientation. FIG. 6B shows a three-dimensional shape model projected onto the captured image on the basis of the approximate position and orientation $T_0'$.

Step S305

In step S305, the position and orientation calculating unit 13 performs model fitting of the three-dimensional shape model to the target object in the image using the approximate position and orientation $T_0'$ as an initial value to calculate the position and orientation of the target object. Specifically, the position and orientation calculating unit 13 projects the three-dimensional shape model onto the captured image on the basis of parameters of the image pickup device 14 and the approximate position and orientation $T_0'$. The position and orientation calculating unit 13 associates features of the projected three-dimensional shape model with those of the target object in the image, reduces the residual between them, and calculates the position and orientation of the target object with high precision. A four-by-four rotation matrix that can be expressed by six parameters representing the calculated position and orientation and performs a coordinate transformation from a model coordinate system to a sensor coordinate system is represented by $T_0$. FIG. 6C shows a three-dimensional shape model projected onto the captured image on the basis of the position and orientation $T_0$ after the fitting. In this example, the approximate position and orientation recognizing unit 12 erroneously detects the front and the back of the individual object. Therefore, even though the position and orientation is calculated with high precision in the present step, a correct position and orientation cannot be obtained by the calculation.

Step S306

In step S306, the position and orientation calculating unit 13 calculates a score for the position and orientation calculated in step S305, compares the score with a predetermined threshold value to determine whether the position and orientation is correct, and determines whether to perform the subsequent processing. For example, three-dimensional distances between geometric features on the model surface in the position and orientation after the fitting and geometric features in the image are acquired as residuals (the amount of deviation). Then, a mean value of the residuals of all the geometric features can be used as a score.

If the calculated mean value of residuals is smaller than or equal to the predetermined threshold value (e.g., 0.1 mm), the position and orientation calculating unit 13 determines that the derived position and orientation is correct, and proceeds to step S310. On the other hand, if the mean value of residuals is greater than the predetermined threshold value, the position and orientation calculating unit 13 determines that the derived position and orientation is incorrect, and proceeds to step S307. The threshold value may be, for example, set by the user in advance. The determination as to whether the position and orientation is correct may be made by other methods. For example, on the basis of the calculated $T_0$, the position and orientation calculating unit 13 may determine a normalized cross-correlation coefficient R of brightness within the region of the object between an image rendered by projecting the model and the captured image, and use the normalized cross-correlation coefficient R to make the determination described above. In this case, if R is greater than or equal to a predetermined value (e.g., 0.9), the position and orientation calculating unit 13 proceeds to step S310. On the other hand, if R is smaller than the predetermined value, the position and orientation calculating unit 13 proceeds to step S307. Any other methods may be used as long as the determination can be made as to whether the position and orientation calculated in step S305 is correct.

The position and orientation calculating unit 13 may skip this operation to always proceed to step S307.

Step S307

In step S307, the position and orientation calculating unit 13 generates N new initial position and orientation candidates using the position and orientation $T_0$ and N transformation parameters acquired from the transformation parameter calculating unit 11. Note that N is one (N=1) in the present embodiment. Here, a relative position and orientation that can be restored from each of the N transformation parameters is expressed as $T_{r\_i}$ (i=1 to N), and a new candidate position and orientation generated using each relative position and orientation is represented by $T_i'$, which can be calculated by $T_i' = T_0 T_{r\_i}^{-1}$. FIG. 6D shows a three-dimensional shape model projected onto the captured image on the basis of the new candidate position and orientation $T_i'$.

Step S308

In step S308, the position and orientation calculating unit 13 calculates (derives) a position and orientation of the target object using the new candidate position and orientation $T_i'$ generated in step S307 as an initial value such that the three-dimensional shape model fits the captured image as in step S305. The position and orientation calculated here is represented by $T_i$.

Step S309

In step S309, the position and orientation calculating unit 13 determines whether the calculation of N positions and orientations $T_i$ has been completed by performing fitting in step S308 for the N new candidate positions and orientations $T_i'$ generated in step S307. If the calculation of N positions and orientations $T_i$ has been completed, the process proceeds to step S310, and if it has not been completed, the process returns to step S307.

The operations in steps S307 and S308 for the N new candidate positions and orientations $T_i'$ may be performed in parallel.

Step S310

In step S310, the position and orientation calculating unit 13 calculates an evaluation value for each of the (N+1) positions and orientations $T_i$ (i=0 to N) calculated in step S308, and outputs a position and orientation with the best evaluation value as a final position and orientation of the target object. The evaluation value used here may be a residual as in the step S306, or a normalized cross-correlation coefficient between the captured image and the image obtained by projecting the target object on the basis of the calculated position and orientation. Any other methods may be used as long as the determination as to whether each of the plurality of positions and orientations is correct can be made on the basis of the evaluation value. FIG. 6E shows a final position and orientation $T_1$ output as a result of evaluation of two positions and orientations $T_0$ and $T_1$.

In the first embodiment, for a target object whose approximate position and orientation is prone to be erroneously recognized, a transformation parameter between two positions and orientations confusable with each other is registered from a GUI in advance. Using the registered information makes it possible to reduce the occurrence of erroneous recognition and accurately calculate the position and orientation.

Specifically, by using the GUI, models are placed in two positions and orientations confusable with each other and the transformation parameter between the two positions and orientations is registered and held. In position and orientation calculation, a position and orientation confusable with a fitting result is generated on the basis of the registered transformation parameter, and another fitting is performed using the generated position and orientation as an initial value. Then, of the two fitting results, a position and orientation with a higher evaluation value is adopted.

With this method, even for an object which has a shape prone to be erroneously recognized and for which it is difficult to generate an initial value expected to produce a true value through fitting, it is possible to generate an appropriate initial value candidate through intuitive input and reduce erroneous recognition.

In the present embodiment, after fitting is performed once for the approximate position and orientation $T_0'$ in step S305, each relative position and orientation $T_{r\_i}$ is used for the calculated position and orientation $T_0$ to generate a new position and orientation candidate. Alternatively, each relative position and orientation $T_{r\_i}$ may be used for the approximate position and orientation $T_0'$ to generate a new position and orientation candidate.

Modification

The first embodiment provides a method in which a position and orientation of a target object whose front and back are confusable can be accurately calculated without erroneous recognition. The present modification provides a method in which, for a target object having many orientations which are confusable with each other, confusable positions and orientations are registered in advance to reduce erroneous recognition.

The apparatus configuration of the present modification will not be described here, as it is the same as that of the first embodiment illustrated in FIG. 1. The processing flow of the present modification will not be described here either, as it is basically the same as that of the first embodiment illustrated in FIG. 3.

The present modification will be described with reference to FIGS. 7A to 7H. FIG. 7A illustrates a three-dimensional shape model of a target object dealt with in the present modification. The target object is in the shape of a propeller having three blades with different shapes, and is not rotationally symmetric. FIG. 7B shows a captured image of the target object. To simplify the following description, an observation image is used, which is in an orientation that allows the z-axis of the sensor to coincide with the z-axis of the three-dimensional shape model. For this image, an approximate position and orientation of an individual object is calculated from the captured image, and fitting of the three-dimensional shape model to image data is performed using the calculated position and orientation as an initial value.

Similarity in observation information may cause erroneous detection in the approximate position and orientation recognizing unit 12. As a result, it is expected that six patterns indicated by broken lines in FIGS. 7C to 7H are calculated as positions and orientations after model fitting. Of these drawings, FIG. 7C shows a correct position and orientation. FIG. 7D shows a position and orientation that deviates −120 degrees from the orientation of FIG. 7C about the z-axis of the model, and FIG. 7E shows a position and orientation that deviates 120 degrees from the orientation of FIG. 7C about the z-axis of the model. FIGS. 7F, 7G, and 7H each show a result in which the back side of the object is erroneously detected, with the front side of the object oriented in the positive direction of the z-axis.

These positions and orientations confusable with each other are registered in advance to reduce erroneous recognition. Specifically, in step S302 of FIG. 3, with the same GUI as that in the first embodiment, a reference model and an operating model are placed such that they have the same relationship as that between the position and orientation of the target object in the captured image and the position and orientation obtained as a result of erroneous recognition in each of FIGS. 7D to 7H, and then the positions and orientations are registered. That is, five transformation parameters are registered in the present modification (N=5). Then, in steps S307 to S309, as in the first embodiment, N confusable positions and orientations are determined for the results of fitting performed using approximate positions and orientations, and fitting is performed by using each of the N confusable positions and orientations as an initial value. Last, in step S310, a position and orientation with the best evaluation value is selected from the (N+1) fitting results $T_i$ (i=0 to N) and output as a final position and orientation.

With the method described above, even for a target object having many orientations which are confusable with each other, it is possible to generate appropriate initial value candidates through intuitive input and reduce erroneous recognition.

Second Embodiment

In the first embodiment, a GUI which allows manipulation of a three-dimensional shape model is displayed in the display screen of the display device 15. Two models are set in two positions and orientations confusable with each other in accordance with a user's manipulation. A transformation parameter between the two positions and orientations is registered (held) in advance, and used in actual position and orientation processing to reduce erroneous recognition.

Unlike the first embodiment, the second embodiment does not perform preprocessing using a three-dimensional shape model. The second embodiment performs a position and orientation measurement on an image of a pile of actual target objects once, selects a pair of correct and incorrect positions and orientations for an individual object from the results of the measurement, and calculates and registers (holds) a transformation parameter between them. In the present embodiment, where a relationship between a correct position and orientation and an incorrect position and orientation actually calculated for an individual object is registered in advance, it is possible to more reliably reduce erroneous recognition.

The configuration of the information processing apparatus 100 according to the second embodiment will not be described here, as it is the same as that of the first embodiment.

A processing procedure of the second embodiment will now be described. The only difference between the first and second embodiments is the operation performed in step S302 of the flowchart of FIG. 3. The other operations, which are common to both the first and second embodiments, will not be described here, and the operation in step S302 will be described in detail.

Step S302 in Second Embodiment

In step S302, the transformation parameter calculating unit 11 calculates a relationship (transformation parameter) between two different positions and orientations confusable with each other, and stores (holds) the calculated transformation parameter. In the present step, a GUI displayed in the display screen of the image pickup device 14, such as that shown in FIG. 8, is used to register the transformation parameter. An image displayed in main window 2 of the display screen is an image of a pile of target objects captured by the image pickup device 14.

Each of functions forming the GUI and a method for registering a transformation parameter will now be described.

Button 6 is used to perform a series of operations which include capturing an image of a pile of target objects, detecting an individual object in the image of the pile, recognizing an approximate position and orientation, and performing model fitting based on the approximate position and orientation. When button 6 is pressed, the operations in steps S303 to S305 of the first embodiment are performed. In the present embodiment, however, M (a plurality of) positions and orientations, instead of a single position and orientation, of an individual object in the image of the pile are calculated (derived).

Specifically, in the operation of approximate position and orientation recognition, the approximate position and orientation recognizing unit 12 extracts M approximate positions and orientations with the highest evaluation values, and performs model fitting using the extracted M approximate positions and orientations as initial values to calculate M positions and orientations. The value of M may be determined in advance, or may be dynamically set in accordance with the evaluation values in the approximate position and orientation recognition. It is necessary that the value of M be determined such that M calculated positions and orientations include both a correct position and orientation and an incorrect position and orientation of the same individual object. That is, after a plurality of approximate positions and orientations, including a correct approximate position and orientation and an incorrect approximate position and orientation, are recognized for a single object, model fitting is performed on the basis of each of the approximate positions and orientations to determine the correct position and orientation and the incorrect position and orientation. For example, for a component placed with its front side facing up, an approximate position and orientation corresponding to the front side is a correct approximate position and orientation, whereas an approximate position and orientation corresponding to the back side is an incorrect approximate position and orientation.

When button 6 is pressed, a position and orientation display window displays parameters (X, Y, Z, Rx, Ry, Rz) representing each of M positions and orientations after model fitting (M=6 in FIG. 8). Main window 2 displays an image of a pile of target objects measured by the image pickup device 14. On the basis of a position and orientation (indicated by a thick line in FIG. 8) selected from the M positions and orientations displayed in the position and orientation display window, a three-dimensional shape model is superimposed on the image displayed in main window 2 (as indicated by a broken line in FIG. 8).

The user checks each of three-dimensional shape models displayed in main window 2 by switching among the M positions and orientations. When the user finds out a correct position and orientation and an incorrect position and orientation for the same individual object in the M positions and orientations, the user checks position and orientation selection checkboxes associated with the correct and incorrect positions and orientations to select them. In FIG. 8, a position and orientation (3) of the M (=6) positions and orientations is selected as an incorrect position and orientation for an individual object located at the right end of the captured image. Additionally, in FIG. 9, a position and orientation (1) is selected as a correct position and orientation for the same individual object at the right end of the captured image. The position and orientation selection checkboxes are no longer selectable when two positions and orientations are checked.

Button 7 is enabled when two positions and orientations are selected with position and orientation selection checkboxes. As in the case of pressing button 3 in the first embodiment, pressing button 7 calculates a transformation parameter between the two selected positions and orientations and adds it to a transformation parameter list. Upon completion of the addition to the list, all the position and orientation selection checkboxes are reset (unchecked).

Upon completion of the addition to the transformation parameter list, as in the first embodiment, two three-dimensional shape models having positions and orientations used in calculating a transformation parameter are displayed in an overlapping manner as a thumbnail (registered orientation thumbnail 2) in registered orientation thumbnail display window 2. The thumbnail is associated with the transformation parameter registered in the list. Thus, pressing the "X" button in the upper right corner of the thumbnail allows the user to delete the registered transformation parameter from the list.

Button 8 and 9 are used to perform the same operations as Button 4 and 5 in the first embodiment, and thus will not be described here.

The method for registering a transformation parameter using the GUI described in the present embodiment is an example, and other methods may be used.

As described above, for an image of a pile of target objects, the second embodiment does not register a relationship between positions and orientations confusable with each other, but performs a position and orientation measurement once. Then, the second embodiment selects a pair of correct and incorrect positions and orientations for an individual object from the results of the measurement, and calculates and registers (holds) a transformation parameter between them. In the present embodiment, where a relationship between a correct position and orientation and an incorrect position and orientation actually calculated for an individual object is registered in advance, it is possible to more reliably reduce erroneous recognition.

Third Embodiment

Applications of an information processing apparatus according to the present invention include using it for measuring a position and orientation of a target component in a system that grasps, moves, and releases components with an industrial robot arm. Hereinafter, an application of the information processing apparatus according to the present invention will be described with reference to FIG. 11.

FIG. 11 is a schematic diagram illustrating a general configuration of a robot system including an information processing apparatus according to the present embodiment. An information processing apparatus 1501 is a personal computer (PC) that controls a robot hand. An image pickup device 1502 includes a camera and a projector. The information processing apparatus 1501 is supplied with software that implements the functions of the information processing apparatus 100 described in the first and second embodiments. The image pickup device 1502 has the same configuration as the image pickup device 14 described in the first and second embodiments. Although the image pickup device 1502 is disposed on a robot arm 1504 in the present embodiment, it may be secured above a target component 1505 in the direction of gravity. A display device that displays a GUI and an operating device that receives a user's manipulation, as described in the first and second embodiments, are not shown in FIG. 11, but are connected to the information processing apparatus 1501. The information processing apparatus 1501 is capable of storing a program that describes the processing procedure described above, and measuring the position and orientation of the target component 1505. Although only one target component 1505 is shown to simplify the drawing, many target components may be placed in a pile, as in the first and second embodiments.

A robot controller 1503 controls the robot arm 1504, which has a movable shaft including a rotation shaft and/or a translational shaft. The robot controller 1503 is connected to the information processing apparatus 1501, from which the robot controller 1503 receives a command for the robot arm 1504 and converts the received command into a specific control command to move the robot arm 1504. The robot hand attached to an end of the robot arm 1504 grasps the target component 1505. The robot hand may be a hand (target object holding unit) capable of holding an object by suction with a suction cup attached thereto.

The robot system of the present embodiment recognizes a position and orientation of the target component 1505 in accordance with the processing procedure described in the first or second embodiment. Then, the robot system transforms the result from the camera coordinate system to the robot coordinate system. On the basis of the resulting position and orientation of the target component 1505 in the robot coordinate system, the robot system causes the robot controller 1503 to move the robot arm 1504 to the position and orientation in which the target component 1505 can be grasped.

In the present embodiment, the robot system having the robot arm 1504 operates it on the basis of the position and orientation of the target component 1505 measured in accordance with the present invention. This makes it possible to grasp (hold) an unknown component.

Fourth Embodiment

The first embodiment compares evaluation values of candidate positions and orientations for the entire target object. The present embodiment sets, in advance, a specific portion which is likely to produce a large difference in evaluation value in a comparison between incorrect and correct orientations, compares evaluation values only for the specific portion, and thus more reliably reduces erroneous recognition. In a target object illustrated in FIG. 12, it is difficult to discriminate between an orientation A and an orientation B obtained by rotating the orientation A 180 degrees about the rotation axis, because there is only a slight difference in appearance between them when they are superimposed on each other. The method of the present embodiment is effective particularly for recognizing a target object having only a slight difference in appearance between a plurality of orientations which are confusable with each other.

The apparatus configuration of the present embodiment will not be described here, as it is basically the same as that of the first embodiment illustrated in FIG. 1. The following description refers only to the transformation parameter calculating unit 11 and the position and orientation calculating unit 13 that perform processing different from the first embodiment.

The transformation parameter calculating unit 11 calculates a transformation parameter between two positions and orientations of three-dimensional shape models in a virtual three-dimensional space, and records the calculated transformation parameter. At the same time, the transformation parameter calculating unit 11 stores a specific portion designated by the user. The specific portion is a portion of an object and is significantly different in appearance between two registered positions and orientations. For example, in the case of the object illustrated in FIG. 12, a region of two small circles near the rotation axis may be designated as a specific portion, because the two circles are slightly changed in location between the orientations A and B obtained by rotating the object about the rotation axis. A GUI and a registration procedure used in the present embodiment will be described below.

The position and orientation calculating unit 13 acquires a three-dimensional shape model from the three-dimensional shape model holding unit 10. The position and orientation calculating unit 13 also acquires an approximate position and orientation from the approximate position and orientation recognizing unit 12. The position and orientation calculating unit 13 also acquires a transformation parameter held by the transformation parameter calculating unit 11. The position and orientation calculating unit 13 also acquires measurement information (grayscale and range images) from the image pickup device 14. The position and orientation calculating unit 13 also acquires a stored specific portion from the transformation parameter calculating unit 11. From the acquired information, the position and orientation calculating unit 13 calculates a position and orientation of the target object.

Specifically, on the basis of the acquired approximate position and orientation, the position and orientation calculating unit 13 first calculates (derives) a position and orientation of a three-dimensional shape model which best fits the target object in the image acquired by the image pickup device 14. Then, on the basis of the acquired transformation parameter, the position and orientation calculating unit 13 determines a position and orientation confusable with the calculated position and orientation, and performs another fitting using the determined position and orientation as an initial value. The processing described so far is the same as that of the first embodiment. Then, for comparing evaluation values of the fitting results, evaluation values for the specific portion are calculated, and a position and orientation with a better evaluation value is output as a final result.

The processing flow of the present embodiment will not be described here, as it is also basically the same as that of the first embodiment illustrated in FIG. 3. The following description refers to steps S302 and S310 that perform processing different from the first embodiment.

Step S302 in Fourth Embodiment

FIG. 13 shows an example of the GUI used in the present embodiment. With this GUI, the user registers confusable orientations and a specific portion. As in the first embodiment, through the transformation parameter calculating unit 11, the user manipulates the GUI using the operating device 16 (e.g., mouse or keyboard). The model manipulation method and the functions of "Reset Position and Orientation", "Perform Fitting", and "Register Orientation" buttons are also the same as those in the first embodiment. A difference from the first embodiment in terms of the GUI is that the GUI of the present embodiment includes a specific portion menu 1300 for designating and registering a specific portion. The specific portion menu 1300 is disabled and does not allow the user to operate it until a confusable orientation is registered. First, with respect to a reference model of a target object displayed in the GUI, the user first moves and rotates an operating model to place it in a confusable position and orientation relative to the reference model. After the user moves and rotates the operating model and presses the "Register Orientation" button to register the confusable orientation, a screen-capture image is displayed as a thumbnail in a registered orientation thumbnail display window 1410 as shown in FIG. 14. As in the first embodiment, pressing the "X" button in the upper right corner of the registered orientation thumbnail display window 1410 can deregister the confusable position and orientation. The processing described so far is the same as that of the first embodiment.

After the confusable orientation is registered, an "Add Specific Portion/Cancel" button 1420 in the specific portion menu 1300 is enabled as shown in the lower part of the GUI in FIG. 14. When the "Add Specific Portion/Cancel" button 1420 is pressed, a rectangle 1430 for selecting a specific portion appears as shown in the center of the GUI. A specific portion to be registered is selected by manipulating (moving, zooming in, or zooming out) the rectangle 1430. When the "Add Specific Portion/Cancel" button 1420 is pressed and the rectangle 1430 for selecting a specific portion is displayed, a "Deregister Specific Portion" button 1510 in the specific portion menu 1300 is displayed at the same time as shown in FIG. 15.

When the "Deregister Specific Portion" button 1510 is pressed, a region surrounded by the rectangle 1430 in the operating model is registered as a specific portion. Specifically, for the surface of the operating model observable from the virtual camera when the rectangle 1430 is selected, the range of existence in the depth direction within the rectangle 1430 designated on the screen is calculated. Then, a three-dimensional space (in the shape of a rectangular parallelepiped here) defined by the calculated range of existence and the rectangle 1430 on the screen is calculated. On the basis of the position and orientation of the operating model with respect to the virtual camera, the three-dimensional space is transformed into a model coordinate system and recorded. At the same time, a three-dimensional rectangle transformed into the model coordinate system is superimposed on the operating model and displayed in the virtual space. The three-dimensional rectangle displayed as a registered specific portion is fixed to the operating model and continues to be displayed in accordance with manipulation of the operating model, unless the registration is cancelled. Although a rectangle is used here to designate a specific portion, a different geometric figure, such as another polygon, a circle, or an ellipse, may be used. A plurality of geometric figures may be provided to allow the user to select any of them. In the case of using a different geometric figure (other than a rectangle) to designate a region, the range of existence in the depth direction within the geometric figure manipulated on the screen is also calculated for the surface of the operating model observable from the virtual camera when the region is selected. Then, a three-dimensional space defined by the calculated range of existence in the depth direction and the geometric figure on the screen is calculated. On the basis of the position and orientation of the operating model with respect to the virtual camera, the three-dimensional space is transformed into a model coordinate system and recorded. For example, when a circle is used to designate a specific portion on the screen, a circular cylinder is recorded, which is obtained by expanding the range of existence in the depth direction of the surface of the operating model observable from the virtual camera.

When the "Add Specific Portion/Cancel" button 1420 is pressed again after selection of a specific portion, the rectangle 1430 disappears and the selection of the specific portion can be cancelled.

When registration of a specific portion is executed, the name of the registered portion appears on the "List of Specific portions" in the specific portion menu 1300 as shown in the lower part of the GUI in FIG. 16. At the same time, the "Deregister Specific Portion" button is enabled. The name of the registered portion can be any name, and it may be determined by direct manual input from the user or may be automatically determined.

A plurality of specific portions can be registered by repeating the above-described operation multiple times. When an additional specific portion is registered, the corresponding information (the name of the specific portion, and a rectangle for designating the specific portion) is added to the "List of Specific portions" and the operating model as shown in FIG. 17.

When the user wants to cancel the registration of a specific portion, the user selects the specific portion on the "List of Specific portions" and presses the "Deregister Specific Portion" button. Selecting any specific portion on the "List of Specific portions" disables the "Register Specific Portion" button. Then, pressing the "Deregister Specific Portion" button deletes the selected specific portion from the "List of Specific portions".

When the registration of all specific portions is completed and the "OK" button is pressed, a specific portion to be paired with each of the recorded specific portions is calculated on the basis of the registered confusable orientations, and the calculated specific portion is recorded. For example, as shown in FIG. 17, confusable orientations having the relationship of the orientations A and B in FIG. 12 are registered, and a region of two circles near the rotation axis of the model is registered as a specific portion where there is a difference in shape between the two orientations. A model surface observable in the orientation A and a model surface observable in the orientation B correspond to the back and front sides of the target object. To compare evaluation values of the two orientations in position and orientation calculation, it is necessary to record a specific portion for both of the two orientations. Therefore, the three-dimensional space of a specific portion recorded using an operating model is transformed into a model coordinate system of a reference model placed in a confusable orientation on the basis of a transformation parameter, so as to record the three-dimensional spaces for the two orientations. Thus, for the two orientations confusable with each other, specific portions to be compared can be recorded. When a plurality of transformation parameters or specific portions are registered, the processing described above is performed on each of their combinations.

Step S310 in Fourth Embodiment

In step S310, for each of the (N+1) positions and orientations $T_i$ (i=0 to N) calculated in step S308, the position and orientation calculating unit 13 calculates an evaluation value for the specific portion designated in step S302, and outputs a position and orientation with the best evaluation value as a final position and orientation of the target object. That is, the present embodiment compares the evaluation values only for the registered specific portion in accordance with the method described above, so as to more reliably reduce erroneous recognition.

The evaluation value used here may be a residual as in the step S306, or a normalized cross-correlation coefficient between the captured image and an image obtained by projecting the target object on the basis of the calculated position and orientation. If a residual is used as the evaluation value, the residual is calculated on the basis only of geometric features contained in any of the plurality of three-dimensional spaces recorded as specific portions. If a normalized cross-correlation coefficient is used, each three-dimensional space recorded as a specific portion is projected onto the screen on the basis of the position and orientation of the model, and an evaluation is performed using a correlation between the positions and orientations within the projected region. The method that performs a comparison by focusing on a recorded specific portion is also applicable to other evaluation values for discriminating between correct and incorrect positions and orientations.

With the method described above, even for recognizing a target object having only a slight difference in appearance between a plurality of orientations which are confusable with each other, it is possible to perform an evaluation that focuses on a specific portion which is likely to produce a significant difference between two shapes. It is thus possible to more reliably reduce erroneous recognition.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a CPU, micro processing unit (MPU), or other circuitry, and may include a network of separate computers or separate computer processors. The computer executable instructions may be provided to the computer, for example, from a network or the storage medium. The storage medium may include, for example, one or more of a hard disk, a RAM, a ROM, a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-058491, filed Mar. 20, 2014 and No. 2015-023714, filed Feb. 9, 2015, which are hereby incorporated by reference herein in their entirety.

The invention claimed is:

1. An information processing apparatus comprising:
a model acquiring unit configured to acquire a three-dimensional shape model of a target object;
a display control unit configured to cause a display unit to display the three-dimensional shape model;
a setting unit configured to set a first orientation of the three-dimensional shape model of the target object and a second orientation of the three-dimensional shape model of the target object that is different from the first orientation on the basis of the three-dimensional shape model displayed in the display unit;
a storage unit configured to store a transformation parameter that transforms the first orientation into the second orientation; and
a unit configured to calculate a first position and orientation of the target object by associating the three-dimensional shape model with an imaged target object,
to transform the associated three-dimensional shape model using the transformation parameter, and
to calculate a second position and orientation of the target object by associating the transformed three-dimensional shape model with the imaged target object,
to determine the position and orientation of the target object based on the first position and orientation and second position and orientation of the target object.

2. The information processing apparatus according to claim 1, further comprising an operating unit configured to manipulate the three-dimensional shape model displayed in the display unit wherein the setting unit sets the first orientation and the second orientation in accordance with the three-dimensional shape model manipulated by the user using the operating unit.

3. The information processing apparatus according to claim 1, wherein the setting unit sets the first orientation and the second orientation by displaying a plurality of three-dimensional shape models in accordance with a plurality of different positions and orientations in the display unit and associating the displayed three-dimensional shape models with each other.

4. The information processing apparatus according to claim 1, further comprising:
an image acquiring unit configured to acquire an image containing the target object; and
a position and orientation deriving unit configured to derive a plurality of positions and orientations of the target object by associating the three-dimensional shape model of the target object with the image,
wherein the display unit displays the three-dimensional shape model in the plurality of derived positions and orientations; and
the setting unit sets the first orientation and the second orientation on the basis of whether the plurality of positions and orientations of the target object derived by the position and orientation deriving unit are the same.

5. An information processing apparatus comprising:
a model acquiring unit configured to acquire a three-dimensional shape model of a target object;
a display control unit configured to cause a display unit to display the three-dimensional shape model;
a setting unit configured to set a first orientation of the three-dimensional shape model of the target object and a second orientation of the three-dimensional shape model of the target object that is different from the first orientation on the basis of the three-dimensional shape model displayed in the display unit; and
a storage unit configured to store a transformation parameter that transforms the first orientation into the second orientation,
wherein the second orientation is obtained by rotating the first orientation 180 degrees about a predetermined axis.

6. The information processing apparatus according to claim 1, further comprising a determining unit configured to determine a specific region of the three-dimensional shape model displayed in the display unit in accordance with a user's manipulation.

7. The information processing apparatus according to claim 1, further comprising:
an image acquiring unit configured to acquire an image containing the target object;
an approximate position and orientation acquiring unit configured to acquire an approximate position and orientation of the target object in the image; and
a deriving unit configured to derive a position and orientation of the target object in the image on the basis of the approximate position and orientation, the transformation parameter, and the three-dimensional shape model.

8. The information processing apparatus according to claim 7, further comprising:
a first fitting unit configured to perform fitting by associating the three-dimensional shape model with the target object in the image in the approximate position and orientation;
a transforming unit configured to transform a position and orientation of the three-dimensional shape model obtained after the fitting with the transformation parameter; and
a second fitting unit configured to associate the three-dimensional shape model with the target object in the position and orientation transformed by the transforming unit, wherein the deriving unit derives the position and orientation of the target object on the basis of a result obtained by the first fitting unit and a result obtained by the second fitting unit.

9. The information processing apparatus according to claim 8, further comprising a deviation acquiring unit configured to acquire the amount of deviation of the result of the fitting performed by the first fitting unit, wherein the transforming unit transforms the position and orientation of the three-dimensional shape model obtained after the fitting with the transformation parameter if the amount of deviation is greater than a threshold value.

10. The information processing apparatus according to claim 7, wherein the information processing apparatus derives the transformation parameter.

11. The information processing apparatus according to claim 8, wherein the first fitting unit performs fitting by associating a whole three-dimensional shape model with a target object in the image, and the second fitting unit performs fitting by associating a specific portion of the three-dimensional shape model, the specific portion being designated in advance and being part of the three-dimensional shape model, with a specific portion which is part of the target object in the image.

12. The information processing apparatus according to claim 7, further comprising a target object holding unit configured to hold the target object, wherein the target object holding unit holds the target object on the basis of the derived position and orientation.

13. An information processing method comprising:
a model acquiring step of acquiring a three-dimensional shape model of a target object;
a display control step of causing a display unit to display the three-dimensional shape model;
a setting step of setting a first orientation of the three-dimensional shape model of the target object and a second orientation of the three-dimensional shape model of the target object that is different from the first orientation on the basis of the three-dimensional shape model displayed in the display unit; and
a storing step of storing a transformation parameter that transforms the first orientation into the second orientation; and
a calculating step of calculating a first position and orientation of the target object by associating the three-dimensional shape model with an imaged target object,
to transform the associated three-dimensional shape model using the transformation parameter, and
to calculate a second position and orientation of the target object by associating the transformed three-dimensional shape model with the imaged target object,
to determine the position and orientation of the target object based on the first position and orientation and second position and orientation of the target object.

14. A non-transitory computer readable storage medium having stored therein a program executed by a computer and causing the computer to function as:
a model acquiring unit configured to acquire a three-dimensional shape model of a target object;
a display control unit configured to cause a display unit to display the three-dimensional shape model;
a setting unit configured to set a first orientation of the three-dimensional shape model of the target object and a second orientation of the three-dimensional shape model of the target object that is different from the first orientation on the basis of the three-dimensional shape model displayed in the display unit;
a storage unit configured to store a transformation parameter that transforms the first orientation into the second orientation; and
a unit configured to calculate a first position and orientation of the target object by associating the three-dimensional shape model with an imaged target object,
to transform the associated three-dimensional shape model using the transformation parameter, and
to calculate a second position and orientation of the target object by associating the transformed three-dimensional shape model with the imaged target object,
to determine the position and orientation of the target object based on the first position and orientation and second position and orientation of the target object.

* * * * *